US012692686B2

(12) United States Patent
Fukuda et al.

(10) Patent No.: US 12,692,686 B2
(45) Date of Patent: Jul. 28, 2026

(54) ATTACHMENT USAGE SYSTEM

(71) Applicant: Kubota Corporation, Osaka (JP)

(72) Inventors: Yuji Fukuda, Sakai (JP); Joshua James Skanderup, Grapevine, TX (US)

(73) Assignee: KUBOTA CORPORATION, Osaka (JP)

( * ) Notice: Subject to any disclaimer, the term of this patent is extended or adjusted under 35 U.S.C. 154(b) by 119 days.

(21) Appl. No.: 18/765,436

(22) Filed: Jul. 8, 2024

(65) Prior Publication Data

US 2026/0009207 A1     Jan. 8, 2026

(51) Int. Cl.
| | |
|---|---|
| *E02F 3/00* | (2006.01) |
| *E02F 3/36* | (2006.01) |
| *E02F 9/26* | (2006.01) |
| *G01S 1/04* | (2006.01) |

(52) U.S. Cl.
CPC ............ *E02F 9/265* (2013.01); *E02F 3/3604* (2013.01); *G01S 1/0423* (2019.08)

(58) Field of Classification Search
None
See application file for complete search history.

(56) References Cited

U.S. PATENT DOCUMENTS

| | | | | | |
|---|---|---|---|---|---|
| 7,630,793 | B2 * | 12/2009 | Thomas | .................... | E02F 9/26 |
| | | | | | 701/50 |
| 8,244,438 | B2 * | 8/2012 | Koch | .................... | E02F 9/2296 |
| | | | | | 701/50 |

| | | | | | |
|---|---|---|---|---|---|
| 8,521,371 | B2 * | 8/2013 | Faivre | .................. | G05B 19/106 |
| | | | | | 701/50 |
| 9,938,693 | B1 * | 4/2018 | Reed | .................. | G06Q 10/0833 |
| 2009/0259373 | A1 * | 10/2009 | Nichols | .................... | E02F 9/264 |
| | | | | | 701/50 |
| 2016/0091002 | A1 * | 3/2016 | Miura | ...................... | E02F 3/96 |
| | | | | | 60/459 |
| 2019/0112792 | A1 * | 4/2019 | Reed | ...................... | E02F 3/437 |
| 2020/0024825 | A1 * | 1/2020 | Futakami | .................. | E02F 3/96 |
| 2020/0379431 | A1 * | 12/2020 | Onose | .................. | G05B 19/408 |
| 2022/0090358 | A1 * | 3/2022 | Oskarsson | ............ | E02F 9/2029 |
| 2022/0289221 | A1 * | 9/2022 | Velde | .............. | B60W 30/18036 |
| 2022/0412040 | A1 * | 12/2022 | Zitterbart | ................ | E02F 3/431 |
| 2023/0164550 | A1 * | 5/2023 | Davis | .................... | H04W 12/50 |
| | | | | | 726/7 |
| 2024/0117608 | A1 * | 4/2024 | Shobe | ...................... | E02F 9/264 |
| 2025/0109574 | A1 * | 4/2025 | Thompson | .............. | E02F 3/436 |

* cited by examiner

*Primary Examiner* — James M McPherson
(74) *Attorney, Agent, or Firm* — Keating & Bennett, LLP

(57) ABSTRACT

An attachment is operable to have therein or thereon a transmitter to periodically transmit a first wireless signal which includes a piece of first attachment information relating to the attachment and which is compliant with a near field communication standard. A portable device is operable to transmit a second wireless signal which includes a piece of second attachment information relating to the attachment to be attached to a hitch of a working vehicle and which is compliant with the near field communication standard. A vehicle controller of the working vehicle is configured or programmed to perform a selecting process to select, according to a predetermined condition, a piece of attachment information included in one of one or more of the first and/or second wireless signals received by a receiver, and perform a predetermined process based on the piece of attachment information selected in the selecting process.

14 Claims, 25 Drawing Sheets

Q1

First attachment information

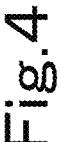
Fig.4
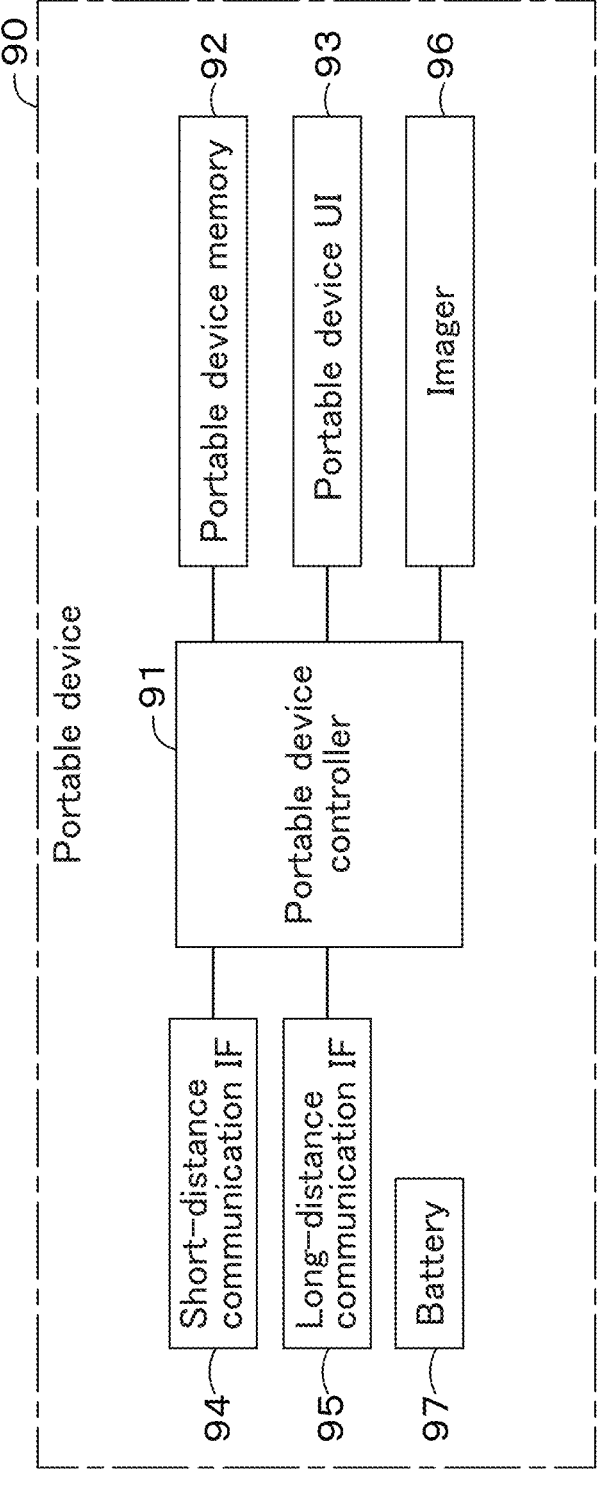

Q2

Second attachment information

Fig.6

| | |
|---|---|
| First BLE information<br>(Attachment ID, beacon ID, first vibration information,<br>RSSI, time information, etc.) | D1 |
| First BLE information<br>(Attachment ID, beacon ID, first vibration information,<br>RSSI, time information, etc.) | D1 |
| First BLE information<br>(Attachment ID, beacon ID, first vibration information,<br>RSSI, time information, etc.) | D1 |
| Second BLE information<br>(Attachment ID, beacon ID, second vibration information,<br>RSSI, time information, etc.) | D2 |
| First BLE information<br>(Attachment ID, beacon ID, first vibration information,<br>RSSI, time information, etc.) | D1 |
| . . . | |

Fig.7

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.8

| Attachment ID | Control data<br>Amount of supply of hydraulic fluid |
|---|---|
| ATT0001 | None |
| ATT0002 | Small |
| ATT0003 | Large |
| ⋮ | ⋮ |

<ATT input process (portable device)>

L1

| Name | Model Number | Specifications |
|---|---|---|
| Bucket | BKxxxx | Excavation, Large, Total length, Total width, etc. |
| Spreader | SPxxxx | Spreading, Total length, Total width, etc. |
| Skid cutter | SKxxxx | Mowing, Small, Total length, Total width, etc. |
| Pallet fork | PFxxxx | Cargo handling, Total length, Total width, etc. |
| Bucket | BKyyyy | Excavation, Small, Total length, Total width, etc. |
| . . . | . . . | . . . |

Fig.11

<BLE information collecting process>

Fig.13

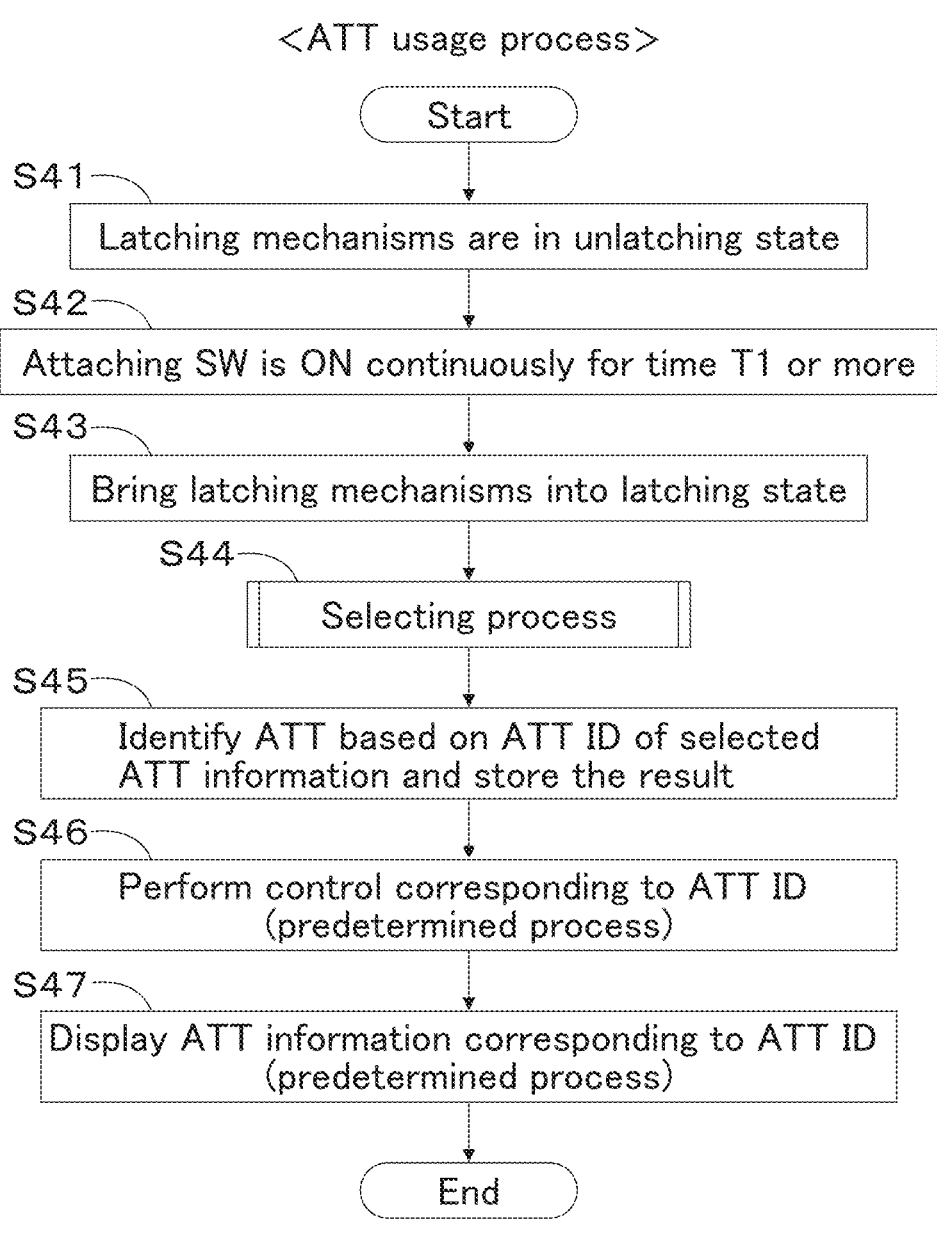

<ATT usage process>

Start

S41  Latching mechanisms are in unlatching state

S42  Attaching SW is ON continuously for time T1 or more

S43  Bring latching mechanisms into latching state

S44  Selecting process

S45  Identify ATT based on ATT ID of selected
ATT information and store the result S46  Perform control corresponding to ATT ID
(predetermined process)

S47  Display ATT information corresponding to ATT ID
(predetermined process)

End

<ATT detaching process>

Start

S61 — Latching mechanisms are in latching state

S62 — Detaching SW is ON continuously for time T2 or more

S63 — Bring latching mechanisms into unlatching state

S64 — End control corresponding to ATT ID

S65 — End display of ATT information corresponding to ATT ID

S66 — Deselect ATT information

End

<ATT usage process>

ATTACHMENT USAGE SYSTEM

BACKGROUND OF THE INVENTION

1. Field of the Invention

The present invention relates to techniques to use attachments on working vehicles.

2. Description of the Related Art

For example, the specification of U.S. Patent Application Publication No. 2022/412040 discloses a system to automatically identify the attachment attached to a working vehicle among attachments in the vicinity of the working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and/or the received signal strength of the first acceleration signal, and transmits the identification information relating to the attachment to the controller. The controller performs an appropriate operation (work action) of the working vehicle based on the received identifying signal.

With the known system as described above, if there is no communication module such as the first communication unit installed on the attachment attached to the working vehicle, the predetermined process corresponding to that attachment cannot be performed on the working vehicle. However, installing a communication module on an attachment is costly, and therefore there may be cases where a communication module cannot be installed on all the attachments possessed by the user. In such a case, when an attachment with no communication module installed is attached to the working vehicle, the predetermined process corresponding to that attachment cannot be performed automatically, causing inconvenience, and there may be cases where work using the attachment cannot be performed appropriately.

SUMMARY OF THE INVENTION

Example embodiments of the present invention make it possible to improve the convenience of using an attachment on a working vehicle and to improve the responsivity of the corresponding predetermined process.

An attachment usage system according to an example embodiment of the present invention includes a working vehicle including a hitch to attach and detach thereto and therefrom an attachment to perform work, and a portable device, wherein the attachment is operable to have therein or thereon a transmitter to periodically transmit a first wireless signal which includes a piece of first attachment information relating to the attachment and which is compliant with a near field communication standard, the portable device includes a short-distance communication interface and is operable to transmit, via the short-distance communication interface, a second wireless signal which includes a piece of second attachment information relating to the attachment to be attached to the hitch and which is compliant with the near field communication standard, the working vehicle includes a receiver to receive the first wireless signal and the second wireless signal, and a vehicle controller, and the vehicle controller is configured or programmed to perform a selecting process to select, according to a predetermined condition, a piece of attachment information which is the piece of first attachment information or the piece of second attachment information included in one of one or more of the first and/or second wireless signals received by the receiver, and perform a predetermined process based on the piece of attachment information selected in the selecting process.

In an example embodiment of the present invention, the portable device may include an input interface to receive input of information indicating the attachment to be attached to the hitch, and a portable device controller configured or programmed to cause the short-distance communication interface to transmit the second wireless signal including the piece of second attachment information which corresponds to the information received via the input interface.

In an example embodiment of the present invention, the portable device may include a portable device memory to store one or more of the pieces of second attachment information relating to one or more of the attachments usable with the working vehicle. The portable device controller may be configured or programmed to read, from portable device memory, one of the one or more pieces of second attachment information that corresponds to the information received via the input interface.

In an example embodiment of the present invention, the attachment usage system may further include a server to store one or more of the pieces of second attachment information relating to one or more of the attachments usable with the working vehicle. The input interface may include a user interface, and a long-distance communication interface to communicate with the server. The portable device controller may be configured or programmed to receive, via the long-distance communication interface from the server, one of the one or more pieces of second attachment information that corresponds to the information received via the user interface.

In an example embodiment of the present invention, the input interface may include a code reader to read an attachment code indicating the attachment to be attached to the hitch. The portable device controller may be configured or programmed to acquire the piece of second attachment information based on the attachment code read by the code reader.

In an example embodiment of the present invention, the working vehicle may include an attaching switch to be operated to attach the attachment to the hitch. The vehicle controller may be configured or programmed to perform the selecting process when the attaching switch is operated continuously for a predetermined period or more.

In an example embodiment of the present invention, the working vehicle may include a traveling device to cause a vehicle body to travel, and a working device to change at least one of a position or a posture of the attachment attached to the hitch to cause the attachment to perform work. The vehicle controller maybe configured or programmed to perform the selecting process when at least one of the traveling device or the working device is actuated with the attachment attached to the hitch.

In an example embodiment of the present invention, the working vehicle may include a mode switch to be operated to activate an attachment mode in which work is performed by the attachment attached to the hitch. The vehicle controller may be configured or programmed to perform the selecting process when the mode switch is operated.

In an example embodiment of the present invention, the working vehicle may include a memory to store, for a period of time, one or more of the pieces of first attachment information included in one or more of the first wireless signals received by the receiver. The vehicle controller may be configured or programmed to, when the second wireless signal is received by the receiver, perform the selecting process to select the piece of second attachment information included in the received second wireless signal, and at a predetermined point in time different from when the second wireless signal is received, perform the selecting process to select, according to the predetermined condition, one of the one or more pieces of first attachment information stored in the memory.

In an example embodiment of the present invention, the working vehicle may include a memory to store, for a period of time, one or more of the pieces of first attachment information included in one or more of the first wireless signals received by the receiver and one or more of the pieces of second attachment information included in one or more of the second wireless signals received by the receiver. The vehicle controller may be configured or programmed to perform the selecting process to select, according to the predetermined condition, one of the one or more pieces of first and/or second attachment information stored in the memory.

In an example embodiment of the present invention, the vehicle controller may be configured or programmed to, when the first wireless signal is received by the receiver, if a received signal strength of the first wireless signal is equal to or higher than a first predetermined value, cause the memory to store the piece of first attachment information included in the first wireless signal, and when the second wireless signal is received by the receiver, if a received signal strength of the second wireless signal is equal to or higher than a second predetermined value, cause the memory to store the piece of second attachment information included in the second wireless signal.

In an example embodiment of the present invention, the transmitter may include a vibration sensor and is operable to, if the vibration sensor detects vibration before the transmitter transmits the first wireless signal, transmit the first wireless signal which includes a piece of first vibration information indicating that there is vibration. The portable device may include an input interface and a portable device controller. The portable device controller may be configured or programmed to, if information indicating the attachment to be attached to the hitch is received via the input interface, cause the short-distance communication interface to transmit the second wireless signal including a piece of second vibration information indicating that there is vibration. The vehicle controller may be configured or programmed to, when the first wireless signal is received by the receiver, if the first wireless signal includes the piece of first vibration information, cause the memory to store the piece of first attachment information included in the first wireless signal, and when the second wireless signal is received by the receiver, if the second wireless signal includes the piece of second vibration information, cause the memory to store the piece of second attachment information included in the second wireless signal.

In an example embodiment of the present invention, the vehicle controller may be configured or programmed to, when the first wireless signal is received by the receiver, cause the memory to store a piece of transmitter information relating to the transmitter included in the first wireless signal such that the piece of transmitter information and the piece of first attachment information are associated with each other, when the second wireless signal is received by the receiver, cause the memory to store a piece of portable device information relating to the portable device included in the second wireless signal such that the piece of portable device information and the piece of second attachment information are associated with each other, and in performing the selecting process, if the one or more pieces of first and/or second attachment information stored in the memory include the piece of second attachment information associated with the piece of portable device information, select the piece of second attachment information.

In an example embodiment of the present invention, the vehicle controller may be configured or programmed to, when the first wireless signal is received by the receiver, cause the memory to store a received signal strength of the first wireless signal such that the received signal strength is associated with the piece of transmitter information and the piece of first attachment information, and in performing the selecting process, if the one or more pieces of attachment information stored in the memory only include one or more of the pieces of first attachment information associated with one or more of the pieces of transmitter information, select one of the one or more pieces of first attachment information that is associated with a highest one of one or more of the received signal strengths stored in the memory.

In an example embodiment of the present invention, the working vehicle may include a detaching switch to be operated to allow the attachment to be detached from the hitch. The vehicle controller may be configured or programmed to, when the detaching switch is operated continuously for a predetermined period of time or more, end the predetermined process and deselect the selected piece of attachment information.

In an example embodiment of the present invention, the transmitter may include a beacon transmitter. The receiver may include a beacon scanner. The portable device may be operable to transmit, via the short-distance communication interface, the second wireless signal with a same frequency as the first wireless signal transmitted by the beacon transmitter.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 4 is a block diagram of a portable device.

FIG. 6 is a diagram showing BLE information stored in an internal memory of a vehicle controller.

FIG. 7 is a diagram showing an example of the relationship between attachment IDs and their corresponding pieces of display data.

FIG. 8 is a diagram showing an example of the relationship between attachment IDs and their corresponding pieces of control data.

FIG. 11 is a screen showing an example of an attachment list.

FIG. 13 is a flowchart showing an example of an ATT usage process.

DETAILED DESCRIPTION OF THE EXAMPLE EMBODIMENTS

Figure 1:
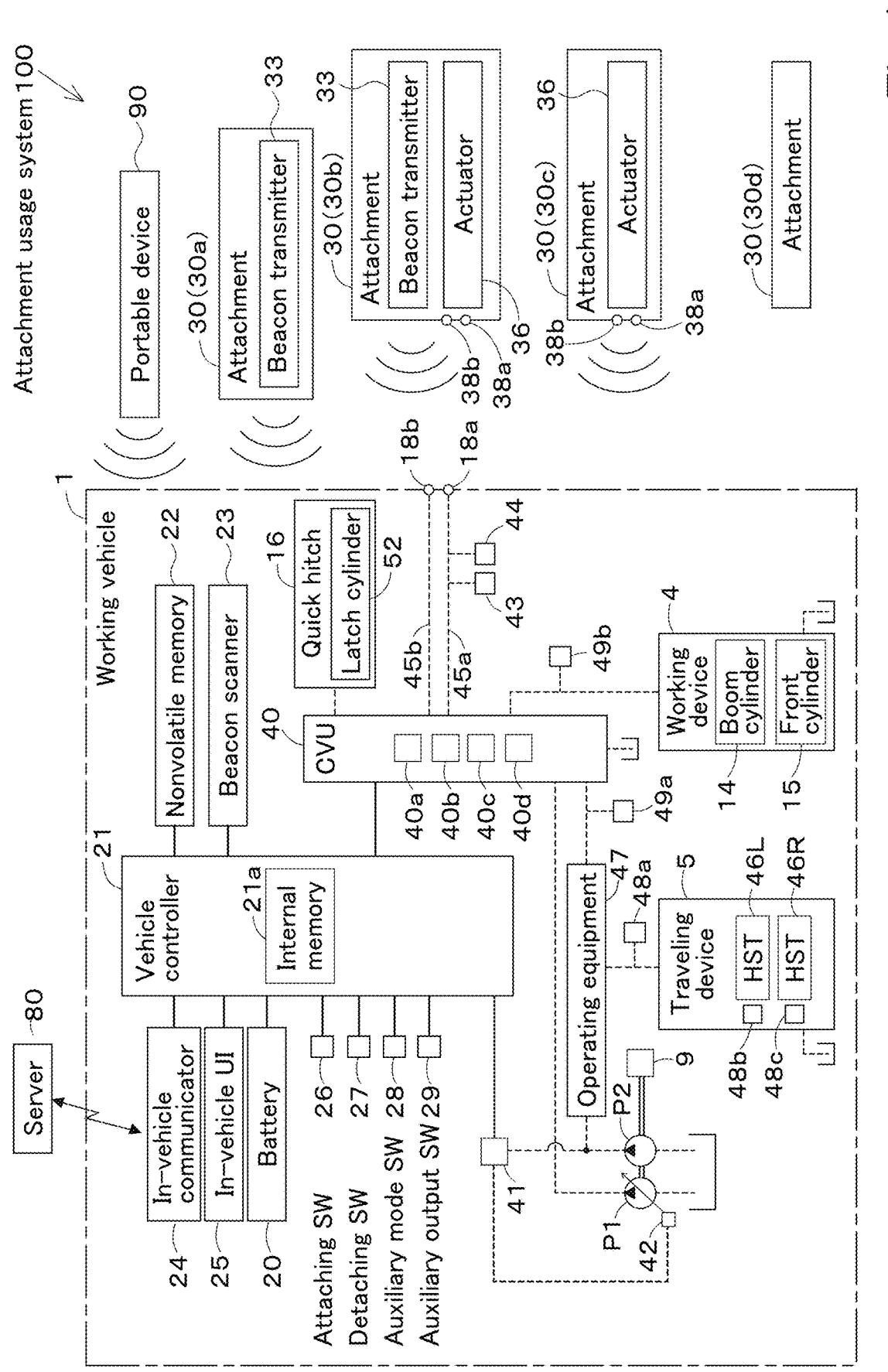
FIG. 1 is a block diagram of an attachment usage system.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 20:
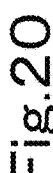
FIG. 20 is a side view of a working vehicle.

FIG. 20 is a side view of a working vehicle 1 according to the present example embodiment. In the present example embodiment, a compact track loader is discussed as an example of the working vehicle 1. Note, however, that the working vehicle according to an example embodiment of the present invention is not limited to a compact track loader, and may be, for example, some other construction machine or agricultural machine such as a skid-steer loader, a backhoe, or a tractor.

The working vehicle 1 includes a vehicle body 2, a cabin 3, a working device 4, and traveling device(s) 5. The cabin 3 is provided on the vehicle body 2. The cabin 3 includes a seat 8, operators (manual operators) to be operated by a user seated on the seat 8, and/or the like. The manual operators include a travel operator 6 to be operated to actuate the traveling devices 5 and a work operator 7 to be operated to actuate the working device 4.

The traveling devices 5 are provided on the left and right sides of the vehicle body 2, support the vehicle body 2, and cause the vehicle body 2 to travel. The traveling devices 5 are crawler traveling devices. The user operates the travel operator 6 to cause both the left and right traveling devices (the traveling device on the left side and the traveling device on the right side) 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the vehicle body 2 (working vehicle 1) to travel forward, rearward, or turn left or right. The travel operator 6 can be operated in operation states corresponding to forward travel, rearward travel, left turn, right turn, and stop of the traveling devices 5.

The working device 4 is attached to the vehicle body 2. The working device 4 includes a bucket 30a, boom(s) 11, lift link(s) 12, control link(s) 13, boom cylinder(s) 14, front cylinder(s) 15, and a quick hitch 16. The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a hydraulic fluid outlet port (power output port) 18a and a hydraulic fluid inlet port 18b.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the vehicle body 2 via a shaft. Upon operation of the work operator 7 along a first direction by the user of the working vehicle 1, the boom cylinders 14 extend or retract and the booms 11 ascend or descend (swing upward or downward).

The booms 11 are provided with the quick hitch 16 at the distal ends thereof. The quick hitch 16 is a linkage configured to easily attach and detach any of various attachments 30 such as the bucket 30a. An attachment 30 is a working tool to perform work. The user of the working vehicle 1 can easily change attachments 30 using the quick hitch 16. The quick hitch 16 is therefore also called "quick changer". In the example shown in FIG. 20, the bucket 30a which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operator 7 along a second direction, the front cylinders 15 extend or retract and the quick hitch 16 swings upward or downward. With this, the bucket 30a attached to the quick hitch 16, swinging upward or downward, performs shoveling or dumping. That is, the working device 4 is operable to change at least one of the position or the posture of the attachment 30 attached to the quick hitch 16 to cause the attachment 30 to perform work.

Figure 21:
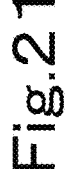
FIG. 21 is an elevational view of a quick hitch.
Figure 22A:
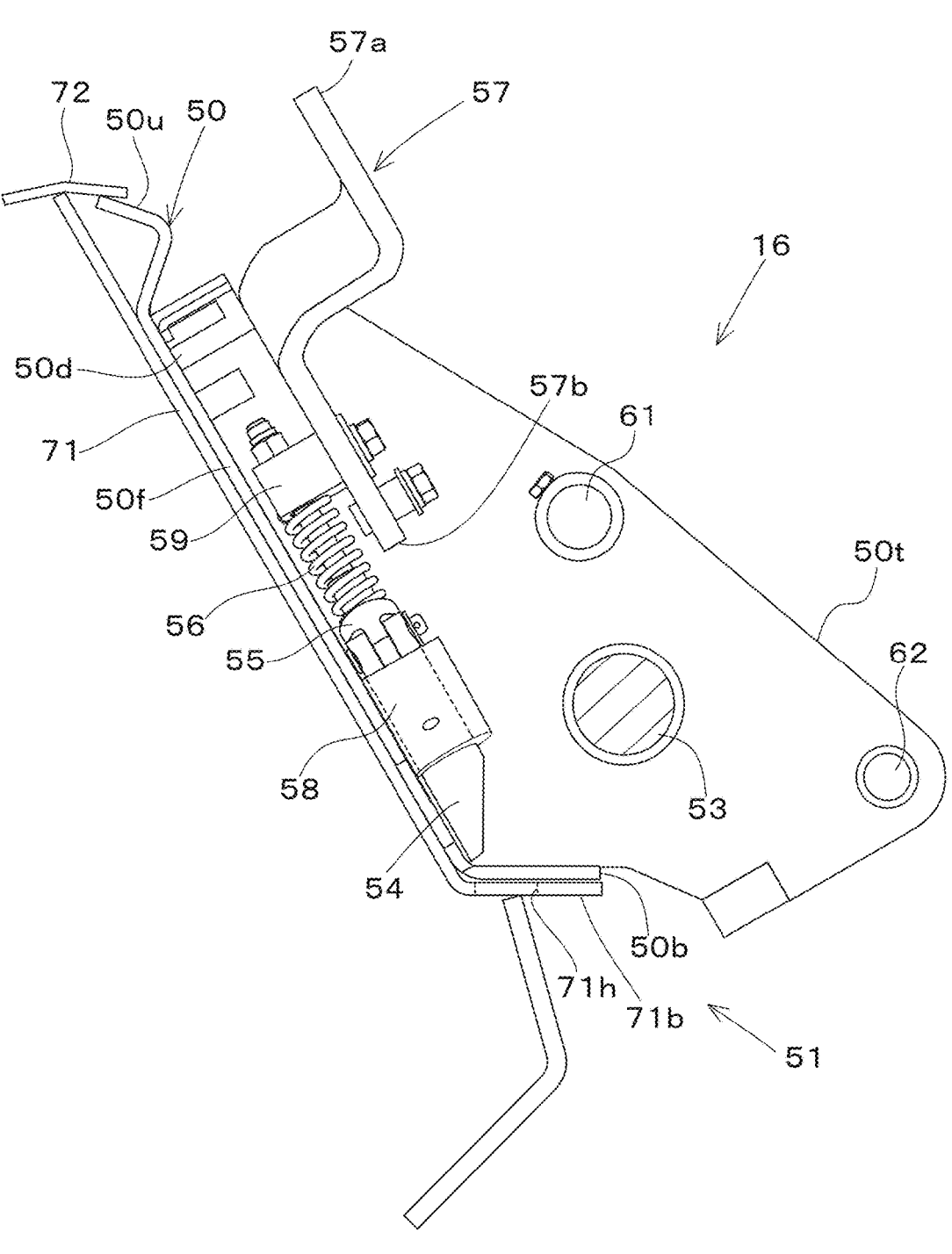
FIG. 22A is a side view of an attachment unlatched by a quick hitch.
Figure 22B:
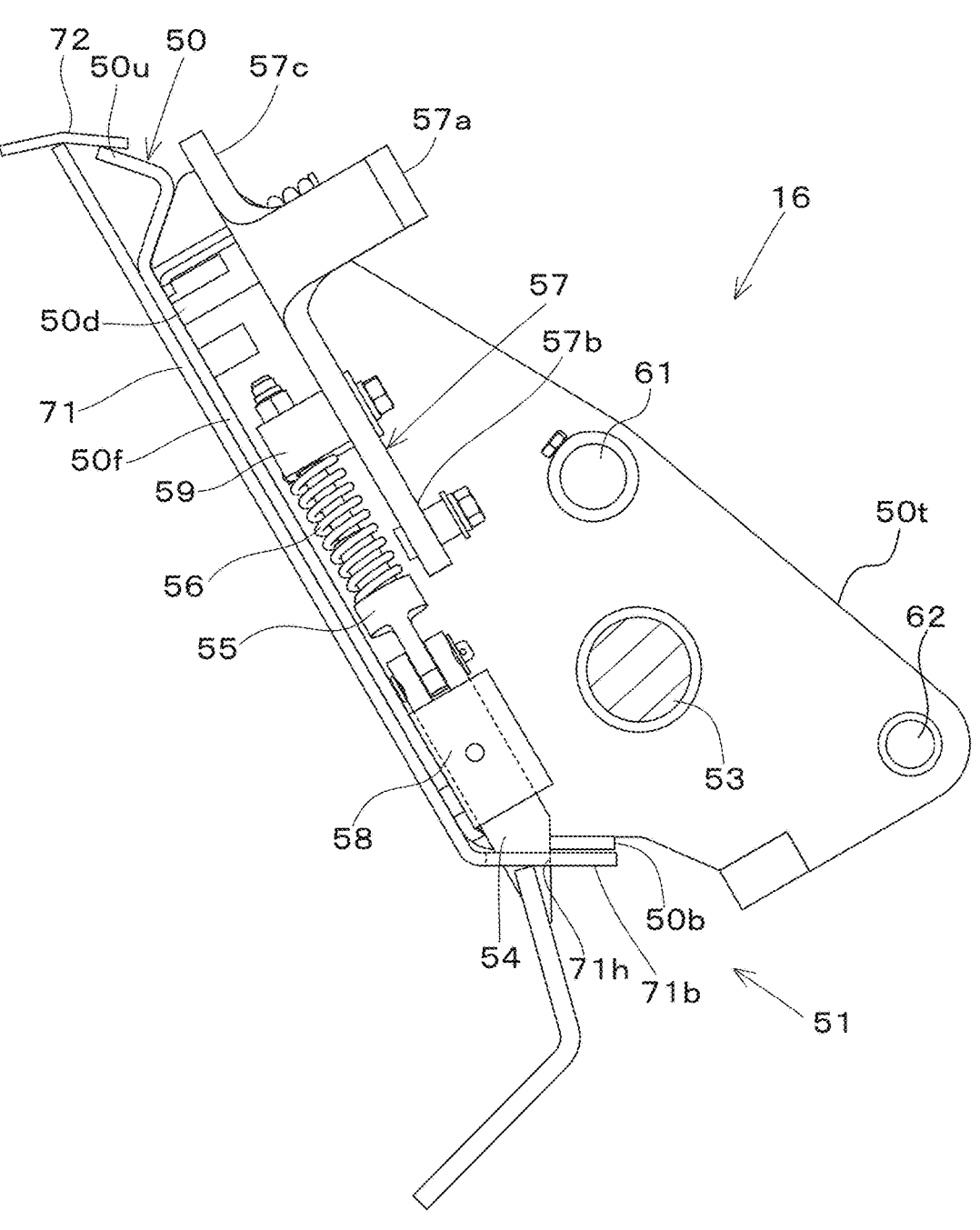
FIG. 22B is a side view of an attachment latched by a quick hitch.

FIG. 21 is an elevational view of the quick hitch 16. Specifically, FIG. 21 illustrates the quick hitch 16 in FIG. 20 as viewed from the vehicle body 2 of the working vehicle 1. FIG. 22A is a side view of an attachment 30 unlatched by the quick hitch 16. FIG. 22B is a side view of the attachment 30 latched by the quick hitch 16.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is not secured (is released) and is allowed to be detached from the brackets 50. The latch cylinder 52 is a latch actuator to place the latching mechanisms 51 selectively in the latching state or the unlatching state.

As illustrated in FIG. 22A, each of the brackets 50 includes a front plate 50f and a pair of connector plates 50t projecting rearward from the front plate 50f. The connector plates 50t have pivotally connected thereto the distal ends of the left and right booms 11 (FIG. 20) via shafts 61, and have pivotally connected thereto ends of the left and right front cylinders 15 (FIG. 20) via shafts 62. The connector plates 50t are connected to a beam 53, so that the pair of brackets 50 are combined.

The front plate 50f of each of the brackets 50 includes an upper portion 50u bent in the form of the letter V as illustrated in FIG. 22A. The front plate 50f includes a lower portion 50b bent such that the lower portion 50b projects diagonally rearward. A top plate 72 bent downward is provided above a base plate 71 of the attachment 30. The base plate 71 includes a lower portion 71b bent such that the lower portion 71b projects diagonally rearward. The lower portion 71b of the base plate 71 has a through-hole 71h.

The upper portions 50u of the front plates 50f of the brackets 50 are inserted into the gap between the base plate 71 and the top plate 72 of the attachment 30 and engage with the back surface of the top plate 72, the front surfaces of the front plates 50f engage with the base plate 71, and the lower portions 50b of the front plates 50f engage with the lower portion 71b of the base plate 71. With this, the attachment 30 is held by the brackets 50.

The latching mechanisms 51 are located inward of the connector plates 50t of the brackets 50 in FIG. 21. Each of the latching mechanisms 51 includes, as illustrated in FIG. 22A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 21. The latch lever 57 includes a bent intermediate portion which is rotatably connected to a mount 50d on a corresponding bracket 50 via pin(s) as illustrated in FIG. 22A. The latch lever 57 includes a first projecting portion 57a which projects inward from corresponding connector plates 50t as illustrated in FIG. 21. The latch lever 57 includes a second projecting portion 57b projecting downward. The second projecting portion 57b has, connected to a back surface of a central portion thereof, the holder 59 via pin(s) as illustrated in FIG. 22A. The latch lever 57 includes a third projecting portion 57c which projects upward as illustrated in FIG. 21.

The latch cylinder 52 is a hydraulic cylinder which is positioned laterally and located above the beam 53. The latch cylinder 52 has a first end (distal end of the rod) pivotally connected to the distal end portion of the second projecting portion 57b of one of the latch levers 57 (right latch lever 57 in FIG. 21) via pin(s). The latch cylinder 52 has a second end (bottom of the cylinder case) pivotally connected to the distal end portion of the second projecting portion 57b of the other of the latch levers 57 (the left latch lever 57 in FIG. 21) via pin(s).

The retraction of the latch cylinder 52, as indicated by dot-dot-dash lines in FIG. 21, causes the second projecting portions 57b of the left and right latch levers 57 to approach each other, causing the latch levers 57 to pivot upward. Then, as illustrated in FIG. 22A, the links 55 and the latch pins 54 move upward and the latch pins 54 detach from the through-holes 71h in the base plate 71 of the attachment 30.

With this, the latching mechanisms 51 are placed in their unlatching state (also referred to as "unlock state") in which the latching mechanisms 51 do not hold the attachment 30, allowing the attachment 30 to be detached from the quick hitch 16. The third projecting portions 57c of the latch levers 57 contact corresponding connector plates 50t of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 21 from the state as illustrated in FIG. 22A, the second projecting portions 57b of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 22B, the latch pins 54 are inserted in the through-holes 71h in the base plate 71 of the attachment 30, so that the inclined surfaces of the latch pins 54 contact the side walls of the through-holes 71h.

With this, the latching mechanisms 51 are placed in their latching state (also referred to as "lock state") in which the latching mechanisms 51 hold the attachment 30, and the attachment 30 is attached to the quick hitch 16. The second projecting portions 57b of the latch levers 57 contact corresponding connector plates 50t of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57a of the latch levers 57 are positioned horizontally, the user seated on the seat 8 of the working vehicle 1 confirms that the attachment 30 is attached to the quick hitch 16 (working vehicle 1) by looking at the horizontally positioned first projecting portions 57a.

Figure 19:
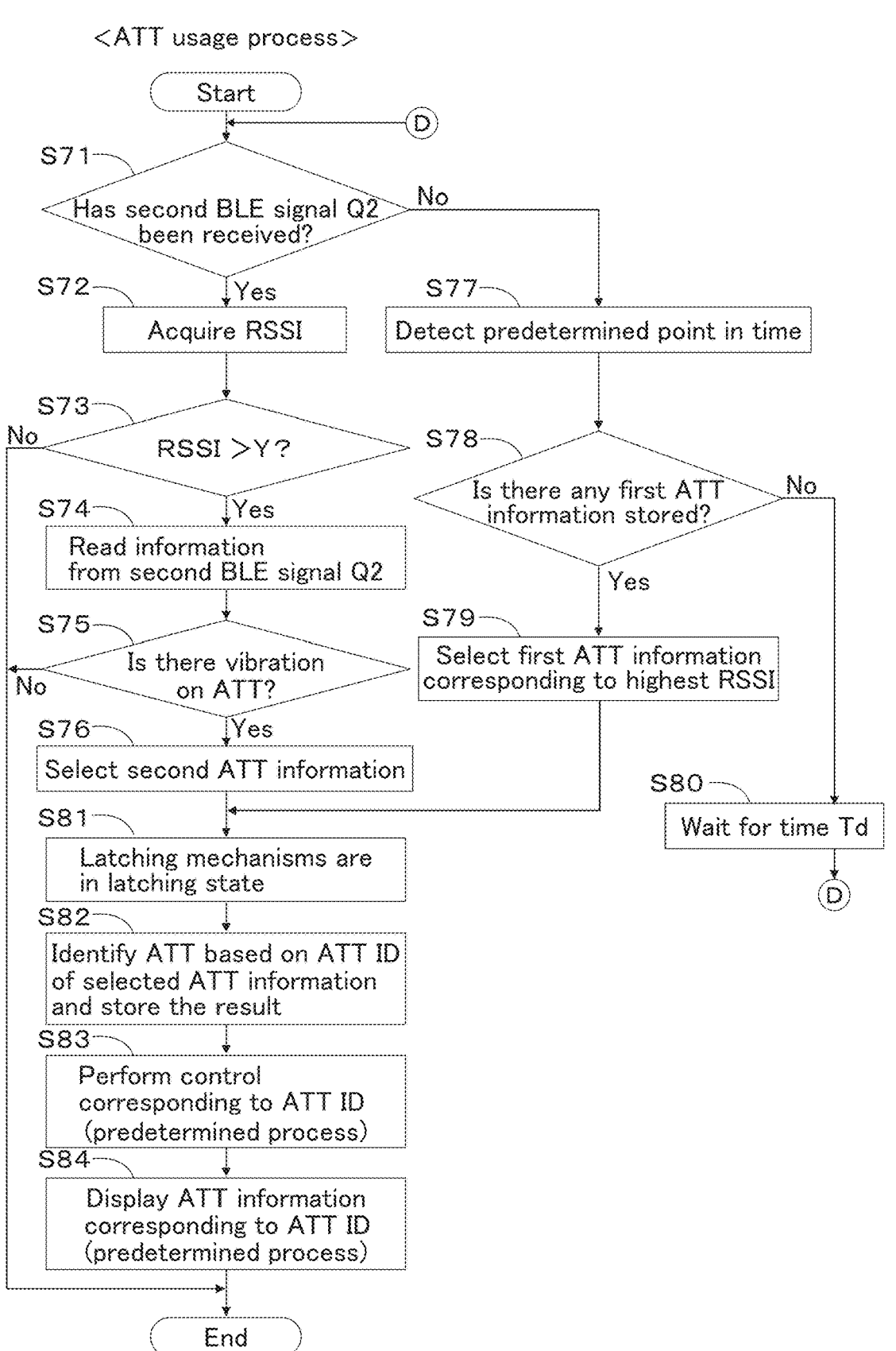
FIG. 19 is a flowchart showing another example of an ATT usage process.

Starting from the state as illustrated in FIG. 19 in which the bucket 30a is attached to the quick hitch 16, the bucket 30a is detached and another attachment 30 is attached to the quick hitch 16. This makes it possible to perform work other than excavation (or some other excavation work) using the other attachment 30.

Examples of attachments 30 other than the bucket 30a include pallet forks, skid cutters, crushers, breakers, angle brooms, earth augers, grapple, sweepers, mowers, snow blowers, and spreaders. Attachments 30 of each type may have different specifications such as sizes and/or shapes. In the present example embodiment, a hydraulic-driven attachment 30 is used, but an electric attachment may be used instead.

FIG. 1 is a block diagram of an attachment usage system 100 according to the present example embodiment. The attachment usage system 100 includes working vehicle(s) 1, attachment(s) 30, and portable device(s) 90. The example in FIG. 1 includes one working vehicle 1, four attachments 30, and one portable device 90, but the number of working vehicles 1, the number of attachments 30, and the number of portable devices 90 included in the attachment usage system 100 may be selected appropriately.

The working vehicle 1 includes a vehicle controller 21, one or more nonvolatile memories 22, a beacon scanner 23, an in-vehicle communicator 24, an in-vehicle user interface (indicated as "in-vehicle UI" in FIG. 1) 25, a battery 20, switches (each switch is indicated as "SW" in FIGS. 1) 26 to 29, and/or the like.

The vehicle controller 21 includes, for example, an information processor circuit including processor(s) and memory (memories). Specifically, the vehicle controller 21 includes a computer. The vehicle controller 21 is configured or programmed to control the working vehicle 1, and perform various controls relating to the working vehicle 1. The vehicle controller 21 is communicably connected to devices in or on the working vehicle 1 via an in-vehicle network such as CAN, ISOBUS, LIN, and/or FlexRay.

Examples of the processor(s) of the vehicle controller 21 include central processing unit (CPU), graphics processing unit (GPU), digital signal processor (DSP), field programmable gate array (FPGA), and application specific integrated circuit (ASIC).

Note that the vehicle controller 21 may include a plurality of physically separated processors which operate together to perform various processes, and the configuration thereof is not limited to those mentioned above. In such a case, the plurality of processors are provided in one or more computers physically separated from the working vehicle 1, and are communicably connected together via an in-vehicle network and/or an external network such as LAN, WAN, and/or the Internet.

The vehicle controller 21 includes an internal memory 21a (first memory) which is a volatile memory or a nonvolatile memory. The vehicle controller 21 may, for example, use a predetermined storage area of the internal memory 21a which is a volatile memory as a buffer for temporary storage of information and data.

The one or more nonvolatile memories 22 (second memory, third memory) are one or more storing devices provided externally to the vehicle controller 21. The internal memory 21a and the nonvolatile memory 22 store software program(s) and control data for the vehicle controller 21 to control operation of the elements. The nonvolatile memory 22 stores pieces of data for control and data for display corresponding to various attachments 30.

The software program(s) may be stored in recording medium (media) (nonvolatile memory such as HDD, SSD, CD-ROM, DVD-ROM) communicably connected to the vehicle controller 21 and/or in an external server 80 connected to the vehicle controller 21 via an external network, and may be installed from the recording medium (media) and/or the external server 80 onto the internal memory 21a and/or the nonvolatile memory 22. The same applies to the foregoing data for control and data for display.

The beacon scanner 23 is a receiver to receive wireless signals (beacon signals) compliant with Bluetooth (registered trademark) Low Energy which is a near field communication standard. The beacon scanner 23 includes a measuring circuit to measure the received signal strength indicator (RSSI, received signal strength) of the received wireless signals.

The in-vehicle communicator 24 includes a communication circuit (communication interface) to transmit and receive wireless signals compliant with Long Term Evolution (LTE, registered trademark), 4th Generation (4G), 5th Generation (5G) and/or the like which are long-distance communication standards (mobile communication standards). The in-vehicle communicator 24 communicates with external devices such as the server 80 and the portable device 90 in a wireless manner via at least one external network such as a mobile communication network and/or the Internet.

The in-vehicle user interface 25 includes an input and an output of the working vehicle 1, and includes, for example, a touchscreen (touch panel) including a display and/or the like. For another example, the user interface 25 may include an input and an output (display) provided independently of each other.

The battery 20 supplies electricity to electric equipment in and/or on the working vehicle 1. The attaching switch 26, the detaching switch 27, the AUX mode switch 28, and the AUX output switch 29 are respective operation switches to be operated by the user of the working vehicle 1. The attaching switch 26 and the detaching switch 27 are momentary operation switches. The in-vehicle user interface 25 and the switches 26 to 29 are provided operably in the vicinity of the seat 8 in the cabin 3.

The attaching switch 26 is operated to attach (secure, fasten) the attachment 30 to the quick hitch 16. The detaching switch 27 is operated to allow the attachment 30 to be detached from the quick hitch 16 (to unfasten the attachment 30 from the quick hitch 16). The AUX mode switch 28 is operated to activate an AUX mode (attachment mode) in which work is performed by the attachment 30 attached to the quick hitch 16. The AUX output switch 29 is operated to supply (output) hydraulic fluid as power for an actuator 26 of a specific attachment 30 via the hydraulic fluid outlet port 18a to the attachment 30.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The vehicle controller 21 controls the opening of the proportional valve 41 to apply pilot pressure, which is the hydraulic pressure of hydraulic fluid delivered by the pilot pump P2, to the regulator 42. The vehicle controller 21 then actuates the regulator 42 to change the angle of the swash plate of the main pump P1 to change the amount of hydraulic fluid delivered by the main pump P1. Operating equipment 47 includes the travel operator 6 and work operator 7, operating valves corresponding to the travel operator 6 and the work operator 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the hydraulic fluid outlet port 18a. The control valve unit 40 also allows hydraulic fluid that flows from the boom cylinders 14, the front cylinders 15, the latch cylinder 52, and the hydraulic fluid inlet port 18b (return fluid) to be discharged. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the hydraulic fluid outlet port 18a.

Specifically, the control valve unit 40 includes control valves 40a, 40b, 40c, and 40d corresponding to the boom cylinders 14, the front cylinders 15, the latch cylinder 52, and the ports 18a and 18b. Each of the control valves 40a, 40b, 40c, and 40d is switchable between a neutral position, a first position, and a second position. At least the control valves 40c and 40d, corresponding to the latch cylinder 52 and the ports 18a, 18b, of the control valves 40a, 40b, 40c, and 40d are electrically actuated solenoid valves. The control valves 40a, 40b, 40c, and 40d are normally held in the neutral position by the elastic force of a spring.

The operating equipment 47 includes the work operator 7 and work operating valves corresponding to the work operator 7. The work operating valve(s) is/are actuated according to the manner in which the work operator 7 is operated, thus allowing the pilot pressure of pilot fluid from the pilot pump P2 to act on pressure receiver(s) of the corresponding control valve(s) 40a and/or 40b via the actuated work operating valve(s). For example, the work operator 7 may be supported on the work operating valves and the work operating valves may be physically actuated by operation of the work operator 7. Additionally or alternatively, a detection sensor to detect the amount (degree) and direction of operation of the work operator 7 may be provided and the vehicle controller 21 may electrically actuate the work operating valve(s) based on the detection result from the detection sensor.

With this, the control valve(s) 40a and/or 40b is/are switched from the neutral position to the first position or the second position, so that hydraulic fluid from the main pump P1 is supplied through the control valve(s) 40a and/or 40b to the boom cylinders 14 and/or the front cylinders 15 to cause the boom cylinders 14 and/or the front cylinders 15 to extend or retract. It follows that the booms 11 and/or the attachment 30 such as the bucket 30a attached to the quick hitch 16 swing.

The pilot pressure (work operating pressure) acting on the pressure receivers of the control valves 40a and 40b from the work operating valves of the operating equipment 47 is detected by pressure sensors 49a. Although only a single pressure sensor 49a is illustrated in FIG. 1, actually pressure sensors 49a (four pressure sensors 49a) are connected to respective fluid passages (four fluid passages) to supply pilot fluid to respective pressure receivers of the control valves 40a and 40b (two pressure receivers of the control valve 40a and two pressure receivers of the control valve 40b). The vehicle controller 21 determines the operation state of the work operating valves and the work operator 7 of the operating equipment 47 based on the pilot pressure detected by the pressure sensors 49a.

For another example, detection sensor(s) such as potentiometer(s) to detect the angle of rotation of the work operator 7, etc. may be provided instead of the pressure sensors 49a. The vehicle controller 21 may determine the operation state of the work operating valves and the work operator 7 of the operating equipment 47 based on output signal(s) from the detection sensor(s). Such detection sensors and pressure sensors 49a are examples of work operation sensors to detect the operation state of the work operator 7, and the work operation sensors are not limited to those described above. In a case that the work operator 7 is an electric work operator to output an electric signal (operation signal) corresponding to the operation state such as a joystick, the vehicle controller 21 may determine the operation state of the work operator based on the electric signal.

The pressure of hydraulic fluid supplied from the control valves 40a and 40b to the boom cylinders 14 and the front cylinders 15, i.e., the supply pressure of hydraulic fluid to the boom cylinders 14 and the supply pressure of hydraulic fluid to the front cylinders 15, are detected by pressure sensors 49b. Although only a single pressure sensor 49b is illustrated in FIG. 1, actually pressure sensors 49b (two pressure sensors 49b) are connected to a fluid passage to supply hydraulic fluid from the control valve 40a to the boom cylinders 14 and a fluid passage to supply hydraulic fluid from the control valve 40b to the front cylinders 15.

The vehicle controller 21 determines the action status (acting state or stopped state) of the working device 4 (including the boom cylinders 14, booms 11, front cylinders 15, quick hitch 16, and the like) based on the supply pressure of hydraulic fluid to the boom cylinders 14 and the supply pressure of hydraulic fluid to the front cylinders 15 detected by the pressure sensors 49b. The vehicle controller 21 regards the supply pressure of hydraulic fluid to the boom cylinders 14 and the supply pressure of hydraulic fluid to the front cylinders 15 as loads on the boom cylinders 14 and the front cylinders 15, and regards the greater of the supply pressures as the load on the working device 4.

For another example, detection sensor(s) to detect the angle of rotation achieved by the boom cylinders 14 and the front cylinders 15, and vibration, acceleration, and/or the like of the boom cylinders 14 and the front cylinders 15 may be provided instead of the pressure sensors 49b. Such detection sensors and pressure sensors 49b are examples of work detection sensors to detect the action status of the boom cylinders 14 and the front cylinders 15, and the work detection sensors are not limited to those described above. In a case that the control valves 40a and 40b are solenoid valves, the vehicle controller 21 may determine the action status of the working device 4 based on the switching positions of the control valves 40a and 40b controlled by the vehicle controller 21.

The vehicle controller 21 controls the actuation of the latch cylinder 52 in response to operation of the attaching switch 26 and the detaching switch 27 of the switches 26 to 29 connected to the controller 21. For example, while the attaching switch 26 is being operated, the vehicle controller 21 places the control valve 40c in the first position to allow hydraulic fluid from the main pump P1 to be supplied to the latch cylinder 52 in the first direction to cause the latch cylinder 52 to extend. Accordingly, the operation of the attaching switch 26 that lasts for a predetermined period of time (first period) T1 or more while the latching mechanisms 51 are in the unlatching state causes the latch cylinder 52 to extend to the predetermined degree or more, bringing the latching mechanisms 51 into the latching state.

Even if the attaching switch 26 is operated, provided that the operation only lasts for a period less than the predetermined period of time T1, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the vehicle controller 21 places the control valve 40c in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a predetermined period of time (second period) T2 or more while the latching mechanisms 51 are in the latching state causes the latch cylinder 52 to retract to a predetermined degree or more, bringing the latching mechanisms 51 into the unlatching state.

Even if the detaching switch 27 is operated, provided that the operation only lasts for a period less than the predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state. The vehicle controller 21 determines whether the latching mechanisms 51 are in the latching state or the unlatching state based on, for example, the position of the control valve 40c.

The predetermined periods of time T1, T2 for the switches 26 and 27 are each, for example, about 2 to 3 seconds. The predetermined periods of time for the switches 26 and 27 may be the same period or different periods. The specific values of the predetermined periods of time T1, T2 are examples, and not limited to the values above. The specific values of another predetermined period of time and a period of time (described later) are also examples and not limited thereto.

If the attaching switch 26 is operated continuously for the predetermined period of time T1 or more with no attachments 30 attached to the quick hitch 16, the vehicle controller 21 determines that an attachment 30 is now attached to (secured to) the quick hitch 16. If the detaching switch 27 is operated continuously for the predetermined period of time T2 or more with the attachment 30 attached to the quick hitch 16, the vehicle controller 21 determines that the attachment 30 is now allowed to be detached from (released from) the quick hitch 16.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating equipment 47 includes the travel operator 6 and travel operating valves corresponding to the travel operator 6. The travel operating valve(s) is/are actuated according to the manner in which the travel operator 6 is operated, thus allowing the pilot pressure of pilot fluid from the pilot pump P2 to act on pressure receiver(s) of the hydraulic pump(s) of the corresponding HST(s) 46L and/or 46R via the actuated travel operating valve(s) and changing the angle of inclination of swash plate(s) of the hydraulic pump(s). For example, the travel operator 6 may be supported on the travel operating valves and the travel operating valves may be physically actuated by operation of the travel operator 6. Additionally or alternatively, a detection sensor to detect the amount (degree) and direction of operation of the travel operator 6 may be provided and the vehicle controller 21 may electrically actuate the travel operating valve(s) based on the detection result from the detection sensor.

This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

The operating equipment 47 includes a travel switching valve for speed change. The position of the travel switching valve is switched in response to a control signal from the vehicle controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The pilot pressure (travel operating pressure) acting on the pressure receivers of the hydraulic pumps of the HSTs 46L and 46R from the travel operating valves of the operating equipment 47 is detected by pressure sensors 48a. Although only a single pressure sensor 48a is illustrated in FIG. 1, actually pressure sensors 48a (four pressure sensors 48a) are connected to respective fluid passages (four fluid passages) to supply pilot fluid to respective pressure receivers of the hydraulic pumps of the HSTs 46L and 46R (two pressure receivers of the hydraulic pump of the HST 46L and two pressure receivers of the hydraulic pump of the HST 46R). The vehicle controller 21 determines the operation state of the travel operating valves and the travel operator 6 of the operating equipment 47 based on the pilot pressure detected by the pressure sensors 48a.

For another example, detection sensor(s) such as potentiometer(s) to detect the angle of rotation of the travel operator 6, etc. may be provided instead of the pressure sensors 48a. The vehicle controller 21 may determine the operation state of the travel operating valves and the travel operator 6 of the operating equipment 47 based on output signal(s) from the detection sensor(s). Such detection sensors and pressure sensors 48a are examples of travel operation sensors to detect the operation state of the travel operator 6, and the travel operation sensors are not limited to those described above. In a case that the travel operator 6 is an electric travel operator, such as a joystick, to output an electric signal (operation signal) corresponding to the operation state, the vehicle controller 21 may determine the operation state of the travel operator based on the electric signal.

The pressure of hydraulic fluid supplied from the hydraulic pumps of the HSTs 46L and 46R to the travel motors, i.e., the travel pressure for the left traveling device 5 and the travel pressure for the right traveling device 5, are detected by pressure sensors 48b. Although only a single pressure sensor 48b is illustrated in FIG. 1, actually pressure sensors 48b (four pressure sensors 48b) are connected to fluid passages (supply fluid passage and return fluid passage) to allow hydraulic fluid to circulate between the hydraulic pump of the HST 46L and the travel motor corresponding to the left traveling device 5 and fluid passages (supply fluid passage and return fluid passage) to allow hydraulic fluid to circulate between the hydraulic pump of the HST 46R and the travel motor corresponding to the right traveling device 5.

The vehicle controller 21 determines the action status (traveling forward/rearward, turning, and stopping) of the traveling devices 5 (left traveling device 5 and right traveling device 5) based on the travel pressure detected by the pressure sensors 48b. The vehicle controller 21 may cause rotation speed sensors 48c to detect the rotation speed of the travel motors of the HSTs 46L and 46R instead of the pressure sensors 48b, and determine the action status of the traveling devices 5 based on the detection result. The rotation speed sensors 48c and the pressure sensors 48b are examples of travel detection sensors to detect the action status of the traveling devices 5, and the travel detection sensors are not limited to those described above.

A plurality of attachments 30 usable with the working vehicle 1 include attachments 30b, 30c including hydraulic actuator(s) 36 and attachments 30a, 30d including no hydraulic actuators 36.

In a case that the user selects one of the attachments 30 (30b, 30c) including a hydraulic actuator 36 and use the selected attachment 30 (30b, 30c) on the working vehicle 1 to perform work, the user attaches the selected attachment 30 (30b, 30c) to the quick hitch 16. The user also connects the hydraulic fluid inlet port 38b of the selected attachment 30 (30b, 30c) and the hydraulic fluid outlet port 18a of the working vehicle 1 using a first hose, and connects the hydraulic fluid outlet port 38a of the attachment 30 (30b, 30c) and the hydraulic fluid inlet port 18b of the working vehicle 1 using a second hose. The vehicle controller 21 detects that the ports 18a, 18b of the working vehicle 1 and the ports 38a, 38b of the attachment 30 (30b, 30c) are connected, via sensor(s) etc.

When the user turns on the AUX mode switch 28 with an attachment 30 attached to the quick hitch 16, the vehicle controller 21 receives such an operation and activates the AUX mode. When the AUX output switch 29 is operated while the ports 38a, 38b of the attachment 30 (30b, 30c) and the ports 18a, 18b of the working vehicle 1 are in connection with each other during the AUX mode, the vehicle controller 21 receives such an operation and switches the control valve 40d from the neutral position to the first position or the second position.

With this, hydraulic fluid from the main pump P1 is supplied (transmitted) through a fluid passage 45a to the hydraulic fluid outlet port 18a, and hydraulic fluid flowing into a fluid passage 45b from the hydraulic fluid inlet port 18b is drained through the control valve unit 40. The hydraulic fluid discharged through the hydraulic fluid outlet port 18a is introduced into the specific attachment 30b through the hydraulic fluid inlet port 38b via a hose or the like. Furthermore, hydraulic fluid (return fluid) discharged through the hydraulic fluid outlet port 38a of the specific attachment 30b is introduced through the hydraulic fluid inlet port 18b via a hose or the like and is drained from the control valve unit 40. Since hydraulic fluid is introduced and discharged to and from the specific attachment 30b as such, hydraulic actuators 36 such as a hydraulic motor and/or hydraulic cylinder(s) of the attachment 30b are actuated, making it possible to perform work using the attachment 30b.

When allowing hydraulic fluid to be introduced and discharged to and from the specific attachment 30b, the vehicle controller 21 changes the opening of the control valve 40d depending on what specific attachment 30b is attached to the quick hitch 16, to adjust the flow rate or hydraulic pressure of hydraulic fluid supplied to the hydraulic fluid outlet port 18a. For example, the vehicle controller 21 may cause the flow rate sensor 43 to detect the flow rate of hydraulic fluid flowing through the fluid passage 45a and control the opening of the control valve 40d. Additionally or alternatively, the vehicle controller 21 may cause the pressure sensor 44 to detect the hydraulic pressure of hydraulic pressure flowing through the fluid passage 45a and control the opening of the control valve 40d.

The vehicle controller 21 may be configured or programmed to, in the case where an attachment 30 (30a, 30d) including no hydraulic actuators 36 is attached to the quick hitch 16, automatically activate the AUX mode without detecting whether the AUX mode switch 28 is operated or not.

The plurality of attachments 30 which can be used with the working vehicle 1 include attachments 30a, 30b with a beacon transmitter 33 and attachments 30c, 30d without a beacon transmitter 33. That is, an attachment 30 is operable to have a beacon transmitter 33 therein or thereon, and the user appropriately decides whether or not to provide a beacon transmitter 33 in or on the attachment 30.

Figure 2:
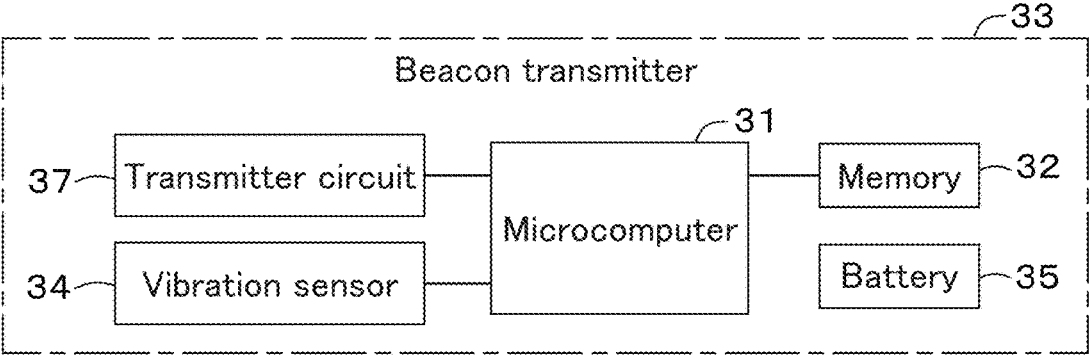
FIG. 2 is a block diagram of a beacon transmitter.

FIG. 2 is a block diagram of a beacon transmitter 33. The beacon transmitter 33 is a transmitter to periodically transmit a first wireless signal that includes first attachment information relating to the attachment 30 (30a, 30b) in or on which the beacon transmitter 33 is provided and that is compliant with Bluetooth (registered trademark) Low Energy. The first wireless signal transmitted by the beacon transmitter 33 is hereinafter referred to as a "first BLE signal". The beacon transmitter 33 transmits the first BLE signal at interval(s) of, for example, about 1 second to about 3 seconds, but the intervals are not limited to about 1 second to about 3 seconds and may be selected as appropriate. The beacon transmitter 33 looks like a small tag, and is therefore sometimes called a "BLE tag".

The beacon transmitter 33 includes a microcomputer 31, a nonvolatile memory 32, a transmitter circuit 37, a vibration sensor 34, a battery 35, and/or the like. The microcomputer 31 includes processor(s) such as CPU and one or more memories. The microcomputer 31 is a controller for the beacon transmitter 33, and performs various controls relating to the beacon transmitter 33. The transmitter circuit 37 is a short-distance communication interface to transmit a wireless signal compliant with Bluetooth (registered trademark) Low Energy. The elements of the beacon transmitter 33 are driven by electricity from the battery 35.

Figure 3:
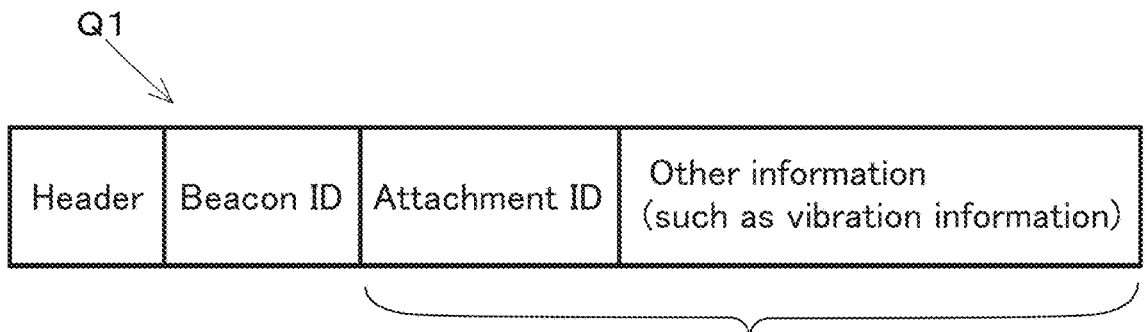
FIG. 3 is a diagram showing an example of information included in a first BLE signal from a beacon transmitter.

FIG. 3 shows an example of information contained in a first BLE signal Q1 transmitted from the beacon transmitter 33. The first BLE signal Q1 includes a header, a beacon ID, an attachment ID, and other information. The beacon ID is identification information relating to the beacon transmitter 33 which is the sender of the first BLE signal Q1. The attachment ID is identification information relating to the attachment 30 (30a, 30b) in or on which the beacon transmitter 33 which is the sender of the first BLE signal Q1 is provided. The beacon ID and the attachment ID are stored in the memory 32.

The other information in the first BLE signal Q1 includes vibration information. The vibration information is information relating to the vibration state detected by the vibration sensor 34 of the beacon transmitter 33 which is the sender of the first BLE signal Q1, i.e., information relating to the vibration state of the attachment 30 (30a, 30b) in or on which the beacon transmitter 33 is provided. The vibration information of the first BLE signal Q1 is, for example, information indicating that there was vibration on the attachment 30 (30*a*, 30*b*) (first vibration information) or information indicating that there was no vibration on the attachment 30 (30*a*, 30*b*) (no-vibration information).

The microcomputer 31 determines whether there is vibration on the attachment 30 (30*a*, 30*b*) based on the detection signal from the vibration sensor 34 and generates vibration information including information indicating whether there is vibration or not (first vibration information, no-vibration information) at predetermined intervals. Then, the microcomputer 31 causes the transmitter circuit 37 to transmit, at predetermined intervals, a first BLE signal Q1 indicating the beacon ID and the attachment ID read from the memory 32 and other information such as the vibration information.

The other information in the first BLE signal Q1 may also include, for example, a specified supply flow rate range (from the minimum flow rate to the maximum flow rate) for hydraulic fluid defined in the specifications of the attachment 30 (30*b*), the latest supply flow rage range for hydraulic fluid set by the user, the optimal supply pressure range for hydraulic fluid set in consideration of the hydraulic system and the like of the working vehicle 1 and attachment 30 (30*b*), the acting time of the attachment 30 (30*a*, 30*b*), and/or the like. The other information in the first BLE signal Q1 may include other identification information such as the name (official name or nickname set by the user), the model number and/or the serial number of the attachment 30 (30*a*, 30*b*), other identification information such as the model number and/or the serial number of the beacon transmitter 33, and the acting time (operation) of the beacon transmitter 33. These pieces of information are written to the memory 32 of the beacon transmitter 33 by at least one of the portable device 90, the server 80, a terminal device exclusively for writing, or the like.

The information relating to hydraulic fluid supplied to the attachment 30 (30*b*), the identification information such as the attachment IDs of the attachments 30 (30*a*, 30*b*), the vibration information, and the action information (operation information) as previously described are examples of first attachment information. The beacon ID (and other identification information of the beacon transmitter 33) is an example of transmitter information relating to the beacon transmitter 33 (transmitter) which is the source of the first BLE signal Q1.

As illustrated in FIG. 20, the beacon transmitter 33 is located on, for example, the back surface of the attachment 30 (30*a*, 30*b*) that faces the vehicle body 2 of the working vehicle 1. The beacon scanner 23 is located at, for example, the front portion of the vehicle body 2 that faces the attachment 30. The vehicle controller 21 is provided in the vehicle body 2. Since the beacon scanner 23 is provided in or on the vehicle body 2, it is possible to achieve a configuration in which output signals from the beacon scanner 23 can be inputted into the vehicle controller 21 using simple electric wiring or simple communication circuit(s) as compared to cases where the beacon scanner 23 is provided on the movable working device 4. In this example, the beacon scanner 23 and the vehicle controller 21 are electrically connected together in a wired manner such as using cable(s), but may communicate with each other in a wireless manner, for another example.

In the case of attaching an attachment 30 on the ground, etc. to the working vehicle 1, while no attachments 30 are attached to the quick hitch 16, i.e., while the latching mechanisms 51 are in the unlatching state, the user of the working vehicle 1 operates the travel operator 6 to cause the traveling devices 5 to travel forward to cause the working device 4 to approach the rear portion of the attachment 30.

The user operates the work operator 7 along the first direction to actuate the boom cylinders 14 to raise or lower the booms 11 of the working device 4 so that the height of the quick hitch 16 at the distal end of the booms 11 matches the height of the attachment 30. The user operates the work operator 7 along the second direction to actuate the front cylinders 15 so that the angle (tilt) of the front plates 50*f* of the brackets 50 of the quick hitch 16 matches the angle of the base plate 71 of the attachment 30.

Next, the user operates the travel operator 6 to cause the traveling devices 5 to travel forward to some degree at very low speed to cause the front plates 50*f* of the quick hitch 16 to engage with the base plate 71 of the attachment 30 as illustrated in FIG. 22A, thus causing the brackets 50 to hold the attachment 30. In so doing, the user may, after causing the front plates 50*f* to engage with the base plate 71, use the work operator 7 to raise the booms 11 to some degree or cause the quick hitch 16 to swing upward to some degree to cause the working device 4 to lift up the attachment 30 to some degree to check whether the attachment 30 is held by the brackets 50.

As such, the attachment 30 vibrates, for example, when the front plates 50*f* of the brackets 50 engage with the base plate 71, when the attachment 30 is lifted up by the working device 4, and when the attachment 30 is latched by the latching mechanisms 51. If the vibrating attachment 30 here has a beacon transmitter 33 therein or thereon, the vibration sensor 34 detects the vibration, and therefore the first BLE signal Q1 transmitted from the beacon transmitter 33 includes first vibration information indicating that there is vibration. The beacon scanner 23 then receives the first BLE signal Q1 including the first vibration information.

The attachment information relating to the attachment 30 can be transmitted to the working vehicle 1 also from a portable device 90. FIG. 4 is a block diagram of the portable device 90. The portable device 90 is a mobile device (mobile computer) such as a smartphone or a tablet device that the user can carry. The portable device 90 includes a portable device controller 91, a portable device memory 92, a portable device user interface 93 (indicated as "portable device UI" in FIG. 4), a short-distance communication interface 94 (indicated as "short-distance communication IF" in FIG. 4), a long-distance communication interface 95 (indicated as "long haul communication IF" in FIG. 4), an imager 96, and a battery 97.

The portable device controller 91 includes, for example, an information processing circuit including processor(s) such as CPU and one or more memories. The portable device controller 91 is configured or programmed to control the portable device 90, and perform various controls relating to the portable device 90. The portable device memory 92 includes a nonvolatile memory. The portable device memory 92 stores second attachment information relating to attachment(s) 30 usable with the working vehicle 1, and the like. The portable device user interface 93 includes a touch panel with a display, speaker(s), microphone(s), hardware operation key(s), and/or the like.

The short-distance communication interface 94 includes a communication circuit to transmit and receive a second wireless signal compliant with Bluetooth (registered trademark) Low Energy. The long-distance communication interface 95 includes a communication circuit to communicate with a server 80 (FIG. 1) included in the attachment usage system 100 via an external network. The imager 96 includes an optical camera. The battery 97 is the power source of the portable device 90 and supplies electricity to each element of the portable device 90. The user interface 93, the long-distance communication interface 95, and the imager 96 are input interfaces of the portable device 90.

The user transmits second attachment information relating to an attachment 30 (30c, 30d) with no beacon transmitters 33 at appropriate point(s) in time to the working vehicle 1 via the portable device 90. Specifically, the portable device controller 91 of the portable device 90 causes the short-distance communication interface 94 to transmit a second wireless signal including second attachment information relating to the attachment 30 (30c, 30d), based on the information inputted via the portable device user interface 93 or the like. The second wireless signal transmitted by the portable device 90 is hereinafter referred to as a "second BLE signal".

Figure 5:
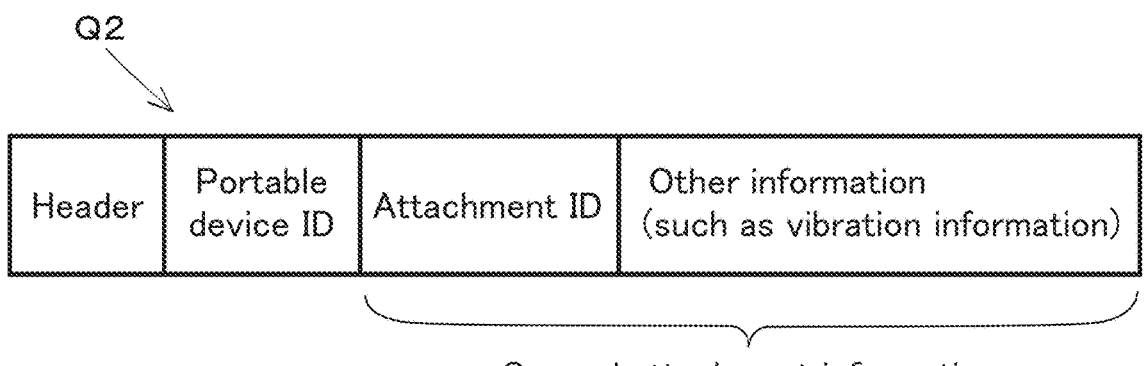
FIG. 5 is a diagram showing an example of information included in a second BLE signal from a portable device.

FIG. 5 illustrates an example of information included in a second BLE signal Q2 transmitted from the portable device 90. The second BLE signal Q2 includes a header, a portable device ID, an attachment ID and other information. The portable device ID is the identification information of the portable device 90 which is the source of the second BLE signal Q2. The portable device ID is stored in the portable device memory 92. The attachment ID is the identification information of an attachment 30 (in the present example, an attachment 30c, 30d having no beacon transmitters 33 therein or thereon) to be attached to the quick hitch 16 of the working vehicle 1.

The other information in the second BLE signal Q2 includes vibration information. The vibration information indicates the vibration state of the attachment 30 to be attached to the quick hitch 16. For example, the vibration information in the second BLE signal Q2 is information (second vibration information) indicating that the attachment 30 vibrated (that there was vibration) when it was attached. The portable device controller 91 may generate vibration information (second vibration information) or may read vibration information (second vibration information) from the portable device memory 92, based on the information inputted via the portable device user interface 93, etc.

The other information in the second BLE signal Q2 may include, similarly to the previously described other information in the first BLE signal Q1, for example, a specified supply flow rate range for hydraulic fluid to the attachment 30 (30b), the most recently set supply flow rage range for the hydraulic fluid, the optimal supply pressure range for the hydraulic fluid, the acting time of the attachment 30 (30a, 30b), and/or other identification information such as the name, the model number and/or the serial number of the attachment 30 (30c, 30d). These pieces of information are written to the portable device memory 92 by at least one of the portable device 90 or the server 80. The information relating to the hydraulic fluid supplied to the attachment 30 (30c), the identification information of the attachment 30 (30c, 30d) such as the attachment ID, the vibration information, and the action information are examples of second attachment information. The portable device ID is an example of portable device information relating to the portable device 90 which is the source of the second BLE signal Q2.

In the case where one or more attachments 30 (30a, 30b) with a beacon transmitter 33 are present in the vicinity of the working vehicle 1 (within the coverage area of the beacon scanner 23), first BLE signal(s) Q1 transmitted by the beacon transmitter(s) 33 is/are received by the beacon scanner 23. In the case where a portable device 90 is present in the vicinity of the working vehicle 1 and a second BLE signal Q2 is transmitted from the portable device 90, the second BLE signal Q2 is received by the beacon scanner 23. Each time the beacon scanner 23 receives the first BLE signal Q1 or the second BLE signal Q2, the beacon scanner 23 measures the RSSI of the received BLE signal Q1, Q2, and outputs the information included in the BLE signal Q1, Q2 and the RSSI to the vehicle controller 21.

The vehicle controller 21 is configured or programmed to, by causing the internal memory (first memory) 21a to store in its predetermined storage area the information included in a first BLE signal Q1 (FIG. 3) received by the beacon scanner 23 as a piece of first BLE information, collect pieces of first BLE information. In so doing, the vehicle controller 21 includes the value of the RSSI of the first BLE signal Q1 and the time information indicating the receipt time (date and time) of the first BLE signal Q1 into the first BLE information, and stores such information in the predetermined storage area of the internal memory 21a.

Also, the vehicle controller 21 causes the internal memory 21a to store, in the predetermined storage area, the information included in a second BLE signal Q2 (FIG. 5) received by the beacon scanner 23, as a piece of second BLE information. In so doing, the vehicle controller 21 includes the value of the RSSI of the second BLE signal Q2 and the time information indicating the receipt time of the second BLE signal Q2 into the second BLE information, and stores such information in the predetermined storage area of the internal memory 21a.

FIG. 6 illustrates pieces of BLE information D1 and D2 stored (collected) in the predetermined storage area of the internal memory 21a. As previously described, the vehicle controller 21 causes the internal memory 21a to store the first BLE information D1 and the second BLE information D2. The first BLE information D1 includes first attachment information such as the attachment ID and the vibration information (first vibration information), the beacon ID, the RSSI, the time information, and/or the like. The second BLE information D2 includes second attachment information such as the attachment ID and the vibration information (second vibration information), the portable device ID, the RSSI, the time information, and/or the like.

In order to keep the capacity of the predetermined storage area of the internal memory 21a at a certain level, the vehicle controller 21 deletes the first BLE information D1 and the second BLE information D2 (or overwrite them with newly generated first BLE information D1 and/or second BLE information D2) after storing them in the internal memory 21a for a period of time.

Note that FIG. 6 shows an example of the manner in which both the first BLE information D1 and the second BLE information D2 are stored in the predetermined storage area of the internal memory 21a. However, in the case where only first BLE signal(s) Q1 is/are received within a certain period of time by the beacon scanner 23, only the first BLE information D1 is stored in the predetermined storage area of the internal memory 21a. Also, in the case where only second BLE signal(s) Q2 is/are received within a certain period of time by the beacon scanner 23, only the second BLE information D2 is stored in the predetermined storage area of the internal memory 21a.

The vehicle controller 21 is configured or programmed to perform a selecting process, when, for example, an attachment 30 is attached to the quick hitch 16. The selecting process is a process in which the vehicle controller 21 selects, according to a predetermined condition, a piece of attachment information (first attachment information or second attachment information) included in one of one or more BLE signals Q1 and/or Q2 (one or more first and/or second BLE signals Q1 and/or Q2) already received by the beacon scanner 23.

Specifically, when, for example, the attaching switch 26 is operated continuously for a predetermined period of time T1 or more while the latching mechanism(s) 51 are in the unlatching state, the vehicle controller 21 determines that an attachment 30 is attached to the quick hitch 16. The vehicle controller 21 then selects, according to a predetermined condition, a piece of attachment information from one or more pieces of attachment information (first attachment information included in first BLE information D1 and/or second attachment information included in second BLE information D2) stored in the internal memory 21a.

The vehicle controller 21 determines that the selected attachment information is the attachment information corresponding to the attachment 30 attached to the quick hitch 16, identifies the attached attachment 30 based on the attachment information, and performs (starts) a predetermined process corresponding to the attachment information. More specifically, the vehicle controller 21, for example, identifies the specifications, etc., of the attached attachment 30 based on the attachment ID included in the selected attachment information, and performs a predetermined process corresponding to the attachment ID.

For example, the predetermined process performed by the vehicle controller 21 includes, in order to indicate that the attachment 30 corresponding to the attachment ID selected via the selecting process is attached to the quick hitch 16 (working vehicle 1), causing the in-vehicle user interface 25 to output (display) predetermined information relating to the attachment 30. In so doing, the vehicle controller 21 reads, from the internal memory 21a as the predetermined information relating to the attachment 30, a portion or whole of the BLE information D1, D2 corresponding to the attachment ID selected via the previous selecting process and outputs the read information. Also, the vehicle controller 21 reads, from the nonvolatile memory 22 as the predetermined information relating to the attachment 30, the information about the attachment 30 corresponding to the attachment ID selected via the previous selecting process and outputs the read information.

Another example of the predetermined process is a process in which the vehicle controller 21 performs a specific control corresponding to the attachment ID selected in the selecting process. For example, the vehicle controller 21 controls, for example, output of hydraulic fluid (power) to the attachment 30 attached to the quick hitch 16 (controls start and stop of output) according to the attachment ID. It is noted here that the vehicle controller 21 may also control at least one of the introduction of hydraulic fluid from the attachment 30, the amount of hydraulic fluid supplied to the attachment 30, or the pressure of hydraulic fluid supplied to the attachment 30.

Display data and control data are pre-set for each of the attachment IDs of attachments 30 attachable to the quick hitch 16, i.e., attachments 30 which can be used with the working vehicle 1.

FIG. 7 is a table showing an example of the relationship between the attachment IDs of the attachments 30 attachable to the quick hitch 16 and pieces of display data corresponding to the attachments 30. A piece of display data is data based on which the in-vehicle user interface 25 displays information about a corresponding attachment 30. The display data includes, for example, an icon, name, and specifications of the corresponding attachment 30. Such an attachment ID and display data of the attachment 30 are stored in a predetermined storage area of the nonvolatile memory 22 such that the attachment ID and the display data of the attachment 30 are associated with each other. Note that display data other than that described above may be stored in the nonvolatile memory 22 such that the display data is associated with the attachment ID.

FIG. 8 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the nonvolatile memory 22 such that the attachment ID and the control data of the attachment 30 are associated with each other.

The vehicle controller 21 performs a predetermined process based on the attachment ID selected in the selecting process and based on the BLE information, the display data, and the control data corresponding to the attachment ID. Note that other control data, such as the value of hydraulic pressure outputted to the attachment 30 and/or the output value of power other than hydraulic fluid, may be stored in the nonvolatile memory 22 such that the control data is associated with the attachment ID.

Figure 9A:
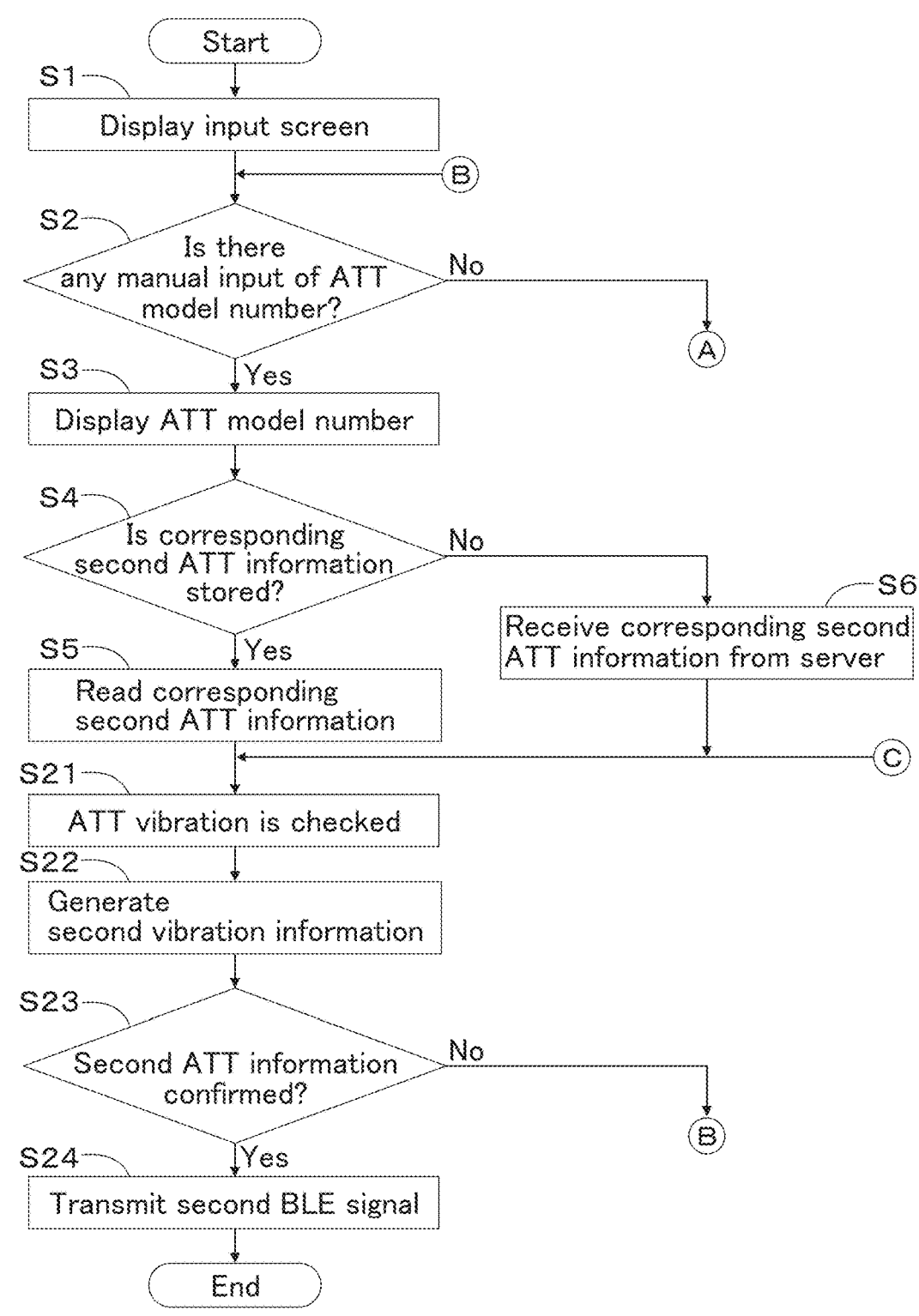
FIG. 9A is a flowchart showing an example of an ATT input process.
Figure 9B:
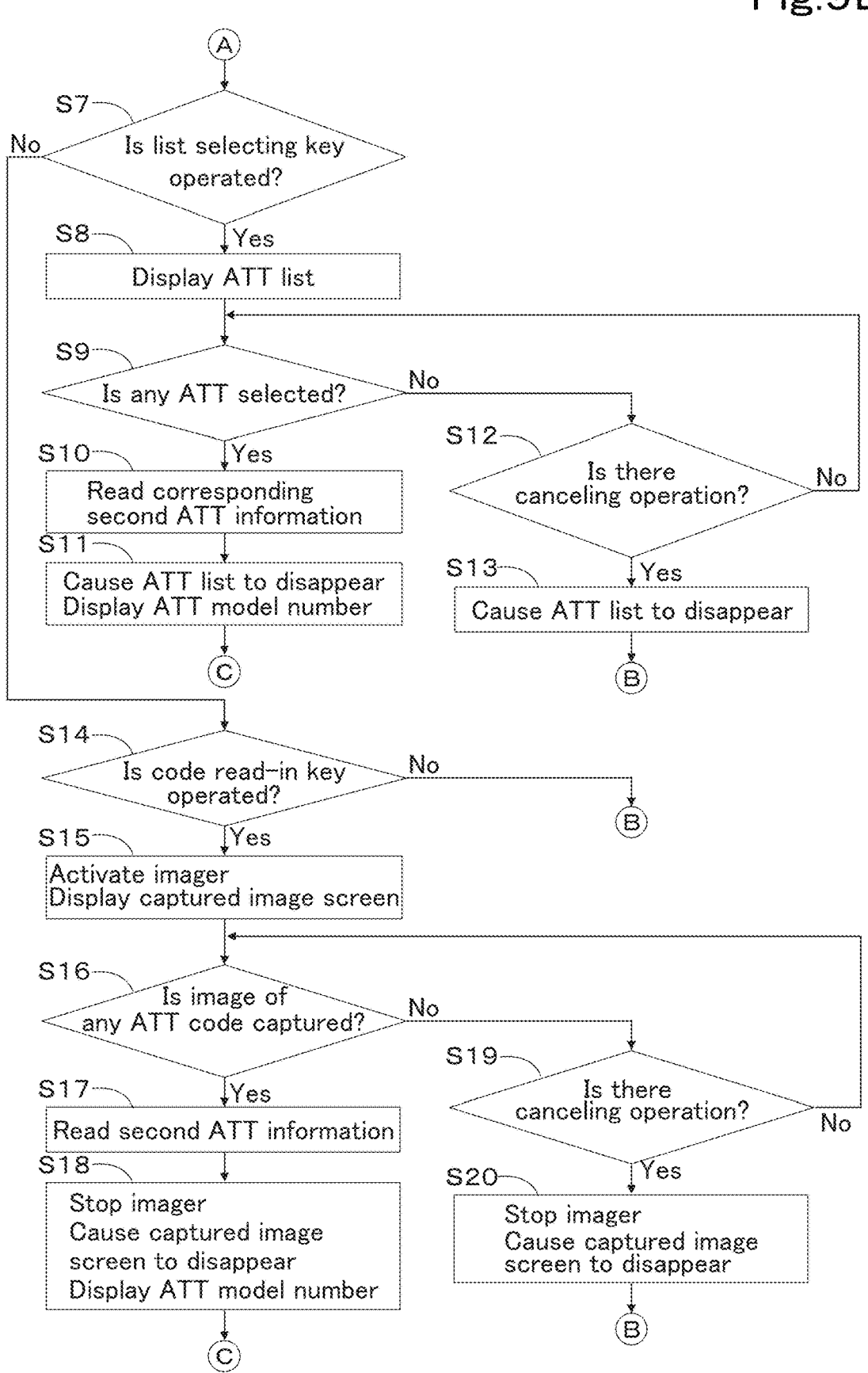
FIG. 9B is a flowchart continued from FIG. 9A.

FIGS. 9A and 9B are a flowchart showing an example of an ATT input process performed on a portable device 90. The present ATT input process is a process in which information indicating the attachment 30 to be attached to the quick hitch 16 of the working vehicle 1 is inputted. For convenience, the attachment is indicated as "ATT" in FIGS. 9A and 9B. The same applies to FIGS. 12 to 14, and FIGS. 16 to 19.

When the user performs a predetermined operation on the portable device user interface 93, the portable device controller 91 performs the ATT input process according to software program(s) (attachment usage application program(s)) stored in the memory 22. First, the portable device controller 91 causes the portable device user interface 93 to display the ATT usage screen G10 (S1).

Figure 10:
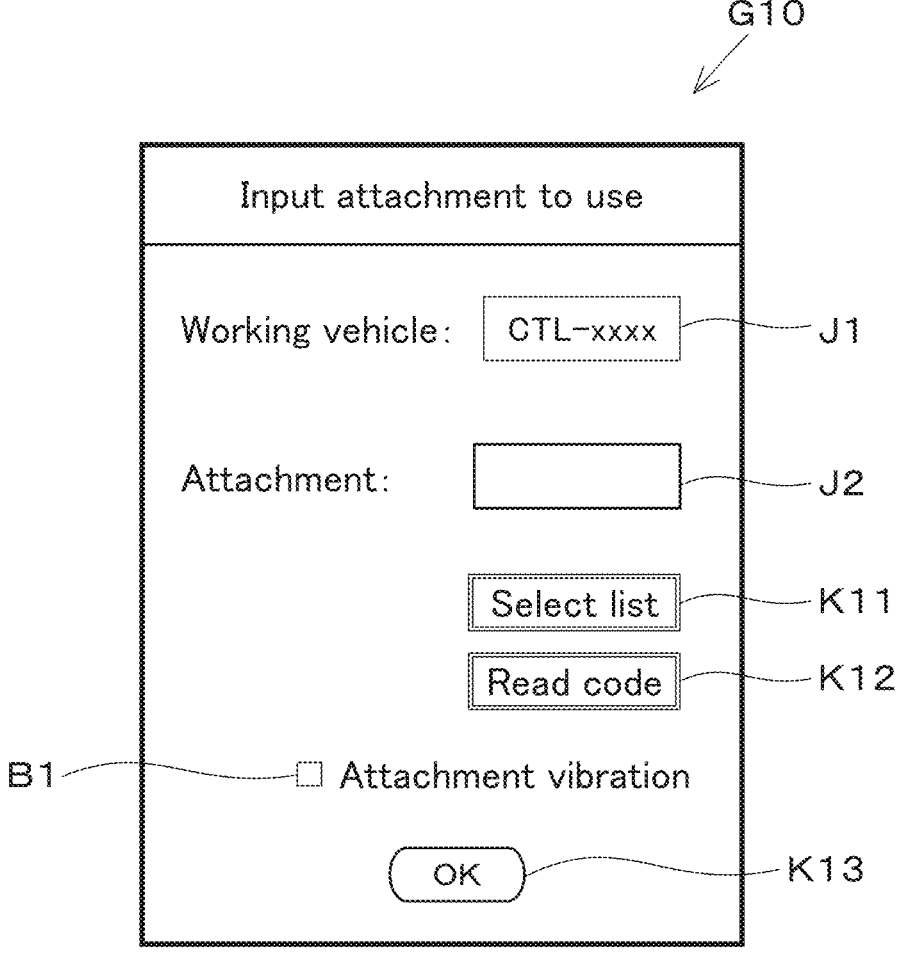
FIG. 10 is a diagram showing an example of an ATT usage screen.

FIG. 10 illustrates an example of the ATT usage screen G10. The ATT usage screen G10 is an input screen on which the attachment 30 to be used on the working vehicle 1 is designated. The ATT usage screen G10 includes a vehicle display box J1, an ATT display box J2, a list selecting key K11, a code read-in key K12, a vibration check box B1, and an OK key K13.

The vehicle display box J1 displays vehicle information indicating the working vehicle 1 that performs work using an attachment 30. In the example of FIG. 10, vehicle information which is the model number of the working vehicle 1 is displayed in the vehicle display box J1. A vehicle modification key to modify the vehicle information may also be displayed on the ATT usage screen G10.

The ATT display box J2 displays information indicating the attachment 30 to be used on the working vehicle 1, i.e., the attachment 30 to be attached to the quick hitch 16 of the working vehicle 1. In the present example, the model number of the attachment 30 is displayed in the ATT display box J2, but this does not imply any limitation. Unique information such as the ID of the attachment 30 may be displayed in the ATT display box J2.

When the user operates the ATT display box J2 by tapping it, the portable device controller 91 causes the portable device user interface 93 to display a text input window on the ATT usage screen G10. By tapping on keys displayed on the text input window, the user can manually input directly (perform manual input of) information such as the model number of the attachment 30 to be attached to the quick hitch 16. As such, when the user manually inputs the model number of the attachment 30 via the portable device user interface 93 (YES at S2 in FIG. 9A), the portable device controller 91 displays the inputted model number in the ATT display box J2 (S3) and searches the portable device memory 92 for the second attachment information corresponding to the model number (attachment ID, etc.)

In the case where the corresponding second attachment information is stored in the portable device memory 92 (YES at S4), the portable device controller 91 reads the second attachment information from the portable device memory 92 (S5). On the other hand, in the case where the corresponding second attachment information is not stored in the portable device memory 92 (NO at S4), the portable device controller 91 accesses the server 80 via the long-distance communication interface 95, and receives the corresponding second attachment information from the server 80 (S6).

Additionally or alternatively, the user is able to select an attachment 30 from the attachment list stored beforehand in the portable device memory 92 of the portable device 90, so that information such as the model number of the selected attachment 30 is automatically inputted. Specifically, when the user taps the list selecting key K11 (FIG. 10) (YES at S7 in FIG. 9B), the portable device controller 91 reads the attachment list L1 including a plurality of attachments 30 that can be used with the working vehicle 1 (that is, the attachments 30 attachable to the quick hitch 16) from the portable device memory 92, and causes the portable device user interface 93 to display the attachment list L1 on the ATT usage screen G10 (S8).

FIG. 11 illustrates an example of the attachment list L1. The portable device controller 91, for example, displays the attachment list L1 as a pop-up on the ATT usage screen G10. The attachment list L1 includes the name, the model number and the specifications for each attachment 30 usable with the working vehicle 1. The specifications include information such as the type of work that can be done by the corresponding attachment 30 and/or the size of the attachment 30.

For example, in the case where the name and the model number of the attachment 30 to be attached to the quick hitch 16 of the working vehicle 1 appear in the attachment list L1, the user taps the row where the name (or the model number) of the attachment 30 is displayed to select the attachment 30 (YES at S9). With this, the portable device controller 91 reads the second attachment information corresponding to the selected attachment 30 from the portable device memory 92 (S10), causes the attachment list L1 to disappear (disappear from the screen), and displays the model number of the selected attachment 30 in the ATT display box J2 (S11).

On the contrary, in the case where the name and the model number of the attachment 30 to be attached to the quick hitch 16 do not appear in the attachment list L1, the user does not select an attachment 30 from the attachment list L1 (NO at S9, and performs a predetermined cancelling operation via the portable device user interface 93 (YES at S12). With this, the portable device controller 91 causes the attachment list L1 to disappear (S13), and waits for another input operation.

Additionally or alternatively, the user is able to have an attachment code such as a two-dimensional code including a QR code (registered trademark) or a barcode corresponding to the attachment 30 read by a code reader, so that information such as the model number of the attachment 30 is automatically inputted. Specifically, when the user taps the code read-in key K12 (FIG. 10) (YES at S14 in FIG. 9B), the portable device controller 91 activates the imager 96, and displays the image captured by the imager 96 on the ATT usage screen G10 (S15). The imager 96 is an example of a code reader, but some other code reader may be provided in or on the portable device 90.

For example, in the case where the attachment code corresponding to the attachment 30 to be attached to the quick hitch 16 is on the sheet attached on the surface of the attachment 30 or on documents such as an instruction manual of the attachment 30, the user captures an image of (reads) the attachment code via the imager 96 (YES at S16). With this, the portable device controller 91 reads information such as the model number of the attachment 30 and/or the second attachment information from the attachment code (S17, information decoding). Then, the vehicle controller 21 stops the imager 96, causes the captured image to disappear (stop being displayed), and displays the read model number of the attachment 30 in the ATT display box J2 (S18).

In the case where the second attachment information of the attachment 30 is not indicated by the captured attachment code, the portable device controller 91 may acquire, from at least one of the portable device memory 92 or the server 80, second attachment information corresponding to the information such as the model number of the attachment 30 read from the attachment code.

In the case where there is no attachment code corresponding to the attachment 30 to be attached to the quick hitch 16, the user does not capture the attachment code with the imager 96 (NO at S16), and performs a predetermined cancelling operation via the user interface 93 (YES at S19). With this, the portable device controller 91 stops the imager 96, causes the captured image to disappear (S20), and waits for another input operation.

After the portable device controller 91 acquires the second attachment information at any of steps S5 and S6 of FIG. 9A and steps S10 and S17 of FIG. 9B, when the user taps the vibration check box B1 of the ATT usage screen G10 (FIG. 10), the portable device controller 91 determines that it is verified (confirmed) that the attachment 30 vibrates when attached (S21 in FIG. 9A), displays a check mark in the vibration check box B1, and generates second vibration information (S22).

Furthermore, when the user taps the OK key K13 (FIG. 10), the portable device controller 91 determines that the model number of the attachment 30 displayed in the ATT display box J2 and the second attachment information corresponding to the model number are confirmed (YES at S23 in FIG. 9A). Then, the portable device controller 91 reads the portable device ID from the portable device memory 92, and causes the short-distance communication interface 94 to transmit a second BLE signal Q2 including the portable device ID, the confirmed second attachment information, and the second vibration information (S24).

Figure 12:
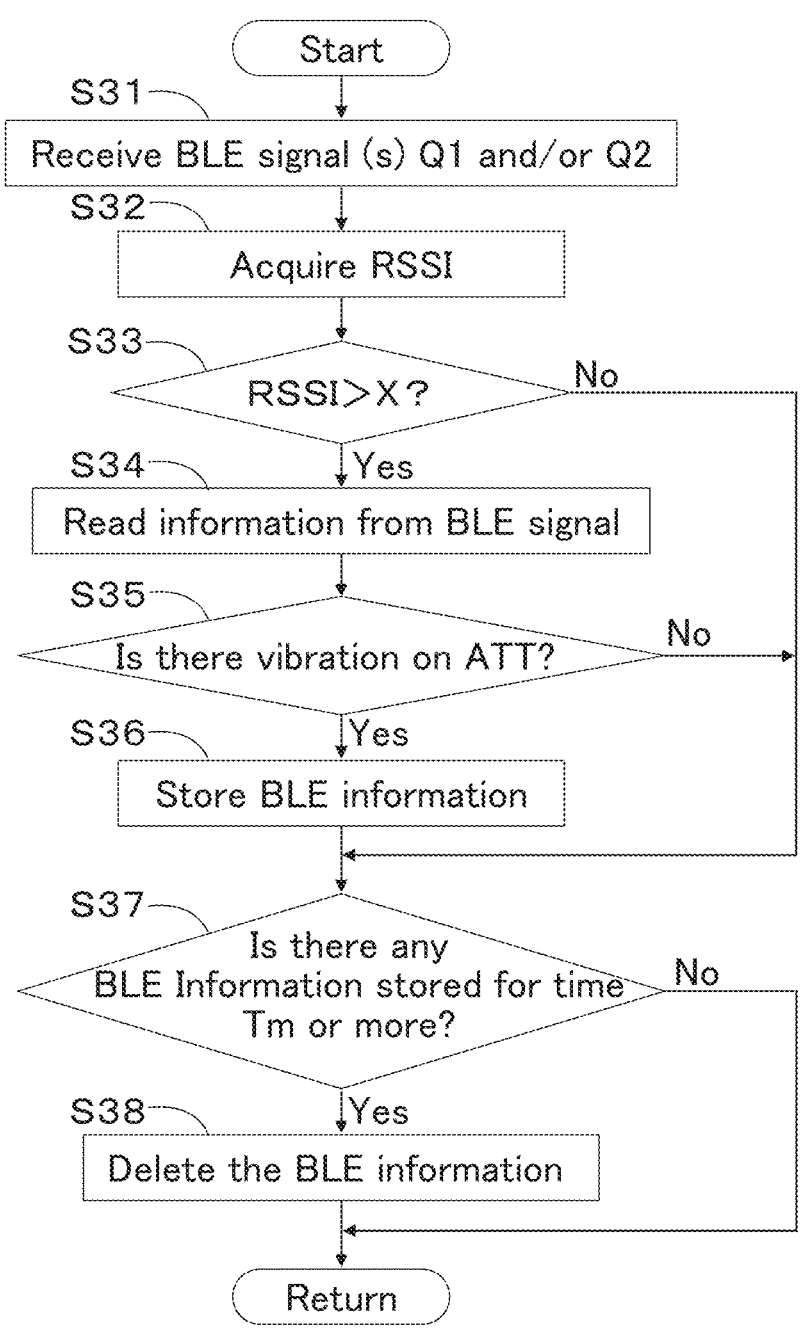
FIG. 12 is a flowchart showing an example of a BLE information collecting process.

FIG. 12 is a flowchart showing an example of a BLE information collecting process. The BLE information collecting process is repeatedly performed by the vehicle controller 21 based on software program(s) stored in the internal memory 21a or the nonvolatile memory 22 while the working vehicle 1 is in operation (while the prime mover 9 is being driven). The same applies to the processes in FIGS. 13, 14, and 16 to 19 (described later).

For example, upon receipt of a first BLE signal Q1 from the beacon transmitter 33 by the beacon scanner 23 (S31 in FIG. 12), the vehicle controller 21 acquires the RSSI of the first BLE signal Q1 from the beacon scanner 23 (S32). If the acquired RSSI is greater than a predetermined value (first predetermined value) X (YES in S33), the vehicle controller 21 reads information from the first BLE signal Q1 (S34).

Next, if the information read from the first BLE signal Q1 includes first vibration information indicating that the attachment 30 is vibrating, the vehicle controller 21 determines that there is vibration on the attachment 30 (YES in S35). The vehicle controller 21 then generates first BLE information D1 including information included in the first BLE signal Q1 and the RSSI of the first BLE signal Q1, etc., and causes the internal memory 21a to store the first BLE information D1 (S36, FIG. 6).

If the RSSI of the first BLE signal Q1 is less than or equal to the predetermined value X (NO at S33 in FIG. 12) or, even if the RSSI is greater than the predetermined value X (YES at S33), provided that the first BLE signal Q1 includes no first vibration information and the vehicle controller 21 determines that there is no vibration on the attachment 30 (NO at S35), the vehicle controller 21 does not cause the internal memory 21a to store the information included in the first BLE signal Q1, the RSSI of the first BLE signal Q1, or the like.

When a second BLE signal Q2 transmitted from the portable device 90 is received by the beacon scanner 23 (S31 in FIG. 12), the vehicle controller 21 acquires the RSSI of the second BLE signal Q2 from the beacon scanner 23 (S32), and if the RSSI is greater than the predetermined value (second predetermined value) X (YES in S33), the vehicle controller 21 reads information from the second BLE signal Q2 (S34).

As another example, the first predetermined value compared with the RSSI of the first BLE signal Q1 and the second predetermined value compared with the RSSI of the second BLE signal Q2 may have different values. For example, assuming that the user operates the portable device 90 at a certain distance from the working vehicle 1 to cause the portable device 90 to transmit the second BLE signal Q2, the second predetermined value Y compared with the RSSI of the second BLE signal Q2 may be set to be smaller than the first predetermined value X compared with the RSSI of the first BLE signal Q1.

Next, if the second vibration information indicating that the attachment 30 is vibrating is included in the information read from the second BLE signal Q2, the vehicle controller 21 determines there is vibration on the attachment 30 (YES at S35). The vehicle controller 21 then generates second BLE information D2 including information included in the received second BLE signal Q2 and the RSSI of the second BLE signal Q2, etc., and causes the internal memory 21a to store the second BLE information D2 (S36, FIG. 6).

In the case where the second BLE information D2 based on the received second BLE signal Q2 is stored as described above, the vehicle controller 21 may provide, to the portable device 90 which is the source of the second BLE signal Q2, a notification including information (hereinafter "acceptance-completed information") indicating that the information (second attachment information) relating to the attachment 30 to be attached to the working vehicle 1 has been accepted.

Specifically, the vehicle controller 21 causes the in-vehicle communicator 24 (FIG. 1) to transmit the acceptance-completed information via an external network to the portable device 90. When the portable device controller 91 of the portable device 90 receives the acceptance-completed information via the long-distance communication interface 95, the portable device controller 91, based on the acceptance-completed information, causes the portable device user interface 93 to display, for example, a message indicating that the information relating to the attachment 30 to be attached has been accepted by the working vehicle 1, and notifies the user with such. With this, the user does not need to input information such as the model number of the to-be used attachment 30 again and again on the foregoing ATT usage screen G10 in FIG. 10, reducing the complexity of the operations on the portable device 90 and improving reliability.

If the RSSI of the second BLE signal Q2 is equal to or lower than the predetermined value X (NO at S33) or, even if the RSSI is greater than the predetermined value X (YES at S33), provided that the second BLE signal Q2 includes no second vibration information and the vehicle controller 21 determines that there is no vibration on the attachment 30 (NO at S35), the vehicle controller 21 does not cause the internal memory 21a to store the information included in the second BLE signal Q2, the RSSI of the second BLE signal Q2, or the like.

If any of the pieces of first BLE information D1 and second BLE information D2 in the internal memory 21a has been stored for a predetermined period of time Tm or more (YES in S37), the vehicle controller 21 deletes that piece(s) of BLE information D1, D2 from the internal memory 21a (S38). The predetermined period of time Tm is, for example, about 30 seconds which corresponds to at least one of the time for an attachment 30 to be attached to the working vehicle 1 or the time for the attachment 30 to be replaced with another one.

FIG. 13 is a flowchart showing an example of an attachment usage process. When the vehicle controller 21 detects that the latching mechanisms 51 are in the unlatching state (YES at S41 in FIG. 13), if the attaching switch 26 is operated (turned ON) continuously for the predetermined period T1 or more (S42), the vehicle controller 21 causes the latch cylinder 52 to extend to a predetermined degree or more to bring the latching mechanisms 51 into the latching state (S43), and performs the first selecting process (S44).

With this, the attachment 30 is attached to the quick hitch 16 and the attachment ID of that attachment 30 is automatically selected. In the present example embodiment, after bringing the latching mechanisms 51 into the latching state at step S43, the vehicle controller 21 starts the selecting process at step S44. Note, however, that as another example, step S43 and step S44 may be started concurrently.

Figure 14:
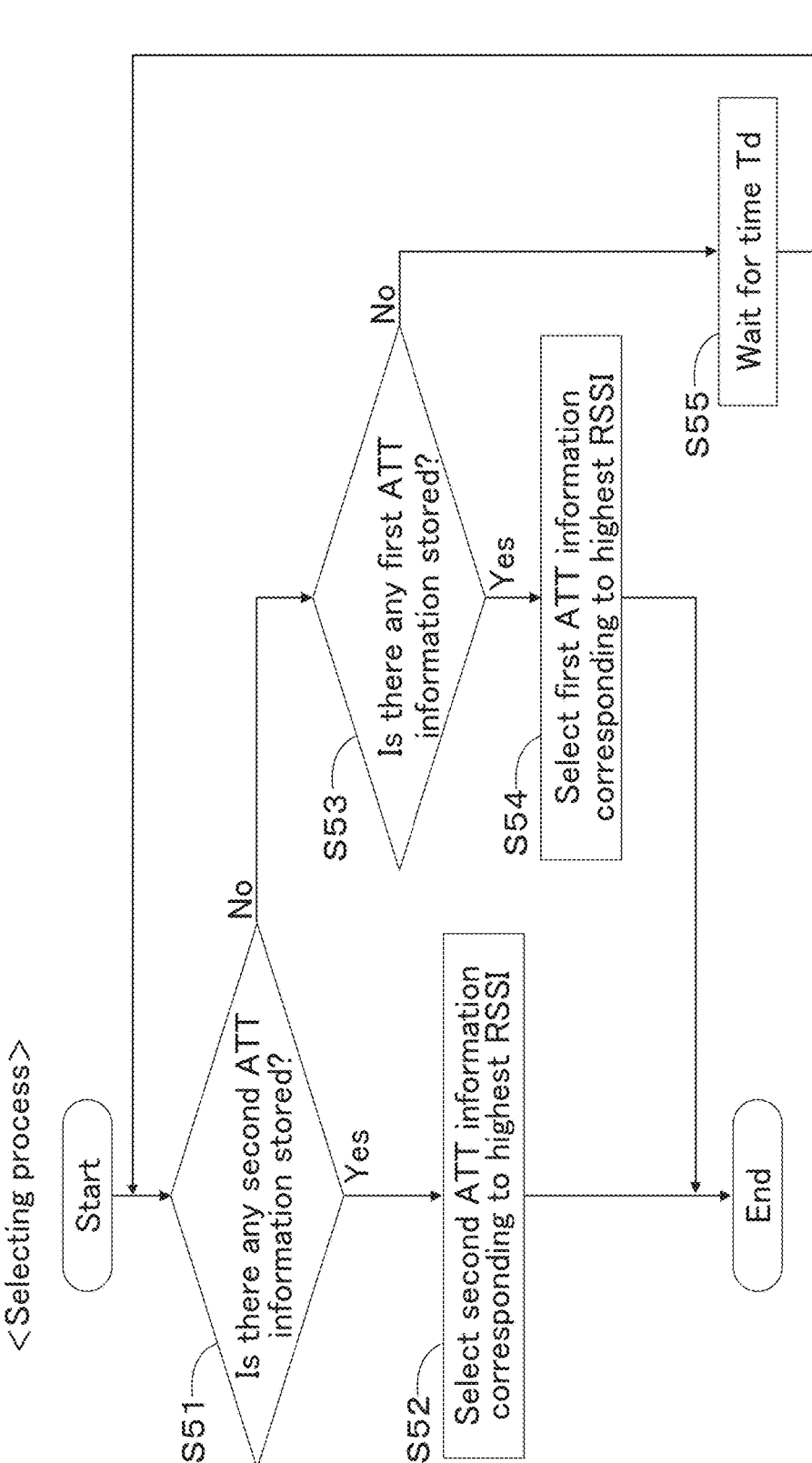
FIG. 14 is a flowchart showing an example of a selecting process.

FIG. 14 is a flowchart showing an example of a selecting process. After the vehicle controller 21 starts the selecting process, the vehicle controller 21 first checks whether there is any second BLE information D2 stored in the internal memory 21a. In so doing, in the case where there are one or more pieces of second BLE information D2 stored in the internal memory 21a (YES at S51), the vehicle controller 21 reads the RSSI(s) included in the piece(s) of second BLE information D2, and selects a piece of second attachment information included in the piece of second BLE information D2 corresponding to the highest RSSI of the read RSSI(s) (S52).

As another example, the vehicle controller 21 may read piece(s) of time information included in piece(s) second BLE information D2 stored in the internal memory 21a and select the piece of second attachment information included in the piece of second BLE information D2 corresponding to the latest one of the read piece(s) of time information (receipt time). In the case where there is only one piece of second BLE information D2 stored in the internal memory 21a, the vehicle controller 21 may select the piece of second attachment information included in the piece of second BLE information D2 without checking the RSSI or the time information.

In the case where there is no second BLE information D2 stored in the internal memory 21a (NO at S51) and there are one or more pieces of first BLE information D1 stored in the internal memory 21a (YES at S53), the vehicle controller 21 reads the RSSI(s) from the piece(s) of first BLE information D1, and selects the piece of first attachment information included in the piece of first BLE information D1 corresponding to the highest one of the read RSSI(s) (S54).

Steps S33 and S35 of FIG. 12, step S52 (or the latest second attachment information) and step S54 of FIG. 14 are examples of a predetermined condition based on which attachment information is selected. However, the predetermined condition is not limited as such, and may include other condition(s).

In the case where there is no second BLE information D2 or first BLE information D1 stored in the internal memory 21a (NO at S51, NO at S53 in FIG. 14), the vehicle controller 21 waits for a predetermined period of time Td (S55), and then returns to step S51. With this, while the vehicle controller 21 is waiting for the predetermined period of time Td, at least one first BLE signal Q1 and/or at least one second BLE signal Q2 is/are received by the beacon scanner 23, and at least one piece of second BLE information D2 and/or at least one first BLE information D1 is/are stored in the internal memory 21a. Therefore, by performing step S51 and subsequent steps again, the vehicle controller 21 can select one or more of the piece(s) of second attachment information and/or one or more piece(s) of first attachment information.

In the case where the vehicle controller 21 has selected second attachment information at step S52 or selected first attachment information at step S54, the vehicle controller 21 determines that the attachment ID included in the selected attachment information is the attachment ID of the attachment 30 attached to the quick hitch 16. Then, based on the determined attachment ID, the vehicle controller 21 identifies (recognizes) the attached attachment 30, and causes the nonvolatile memory 22 (which may be the internal memory 21a), etc., to store the result of the identification (S45 in FIG. 13).

Specifically, at step S45, the vehicle controller 21 reads the BLE information D1, D2 (FIG. 6) corresponding to the determined attachment ID from the internal memory 21a, and reads the display data (FIG. 7) and the control data (FIG. 8) corresponding to that attachment ID from the nonvolatile memory 22. Then, based on the read BLE information D1, D2, display data, and control data, the vehicle controller 21 identifies the name, the type and the other specifications of the attached attachment 30.

The vehicle controller 21 also performs (starts) a predetermined control corresponding to the determined attachment ID (S46, predetermined process). In so doing, based on the control data read from the nonvolatile memory 22, the vehicle controller 21 performs a predetermined control on the working vehicle 1.

Specifically, in the case where the attachment 30 corresponding to the determined attachment ID (i.e., the attachment 30 attached to the quick hitch 16) is an attachment 30b, 30c including a hydraulic actuator, the vehicle controller 21 starts causing the control valve 40d to control the output of hydraulic fluid from the hydraulic fluid outlet port 18a to the attachment 30b, 30c, based on the control data read from the nonvolatile memory 22. With this, draining of return fluid to be introduced from the attachment 30b, 30c into the hydraulic fluid inlet port 18b is also started. The vehicle controller 21 may, for example, cause a monitor screen G1 to display a message indicating that the control of the output of hydraulic fluid to the attachment 30b, 30c has been started.

Note that the attachment 30b, 30c actually starts to be supplied with hydraulic fluid from the hydraulic fluid outlet port 18a under control of the vehicle controller 21 when the auxiliary output switch 29 (FIG. 1) is turned on. Also, when the auxiliary output switch 29 is turned off, the supply of hydraulic fluid to the attachment 30b, 30c from the hydraulic fluid outlet port 18a is stopped by the vehicle controller 21.

On the other hand, in the case where the attachment 30 attached to the quick hitch 16 is an attachment 30 a, 30d including no hydraulic actuators such as a bucket 30a, the vehicle controller 21 does not cause the control valve 40d to output hydraulic fluid from the hydraulic fluid outlet port 18a to the attachment 30 a, 30d based on the control data read from the nonvolatile memory 22. As another example, the vehicle controller 21 may, at step S46 in FIG. 13, perform control such as adjusting and/or limiting the travel speed and/or speed stage of the working vehicle 1 and/or the height of the raised/lowered booms 11 according to the determined attachment ID.

The vehicle controller 21 causes the in-vehicle user interface 25 to display (output) information about the attachment 30 corresponding to the determined attachment ID (S47, predetermined process). In so doing, the vehicle controller 21 extracts information about the attached attachment 30 from the BLE information D1, D2 and display data corresponding to the determined attachment ID, and causes the in-vehicle user interface 25 to display that information on the monitor screen G1.

Figure 15A:
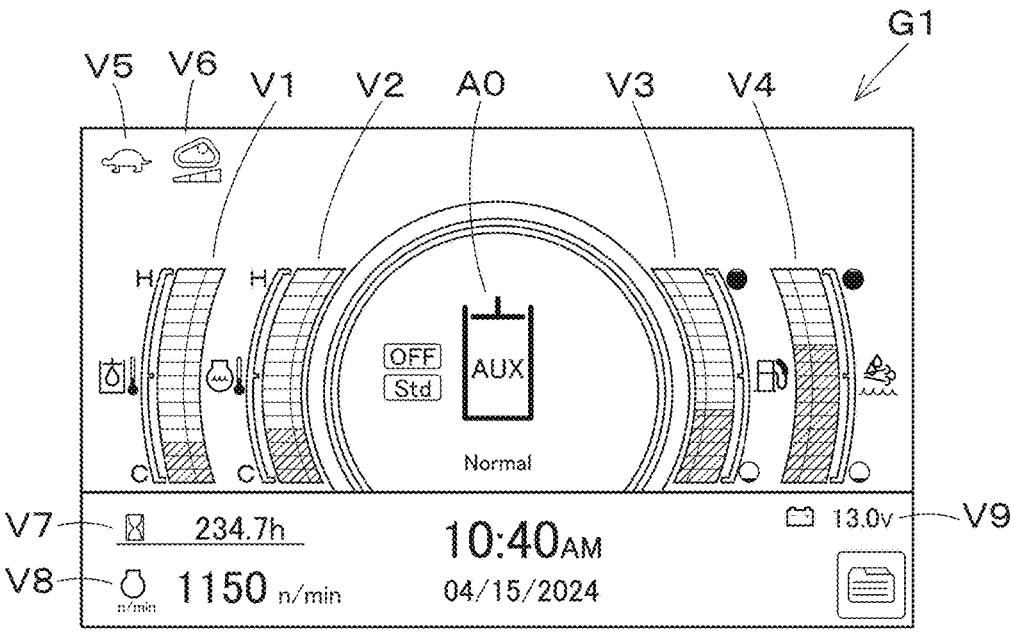
FIG. 15A illustrates an example of a monitor screen before an attachment is attached.
Figure 15B:
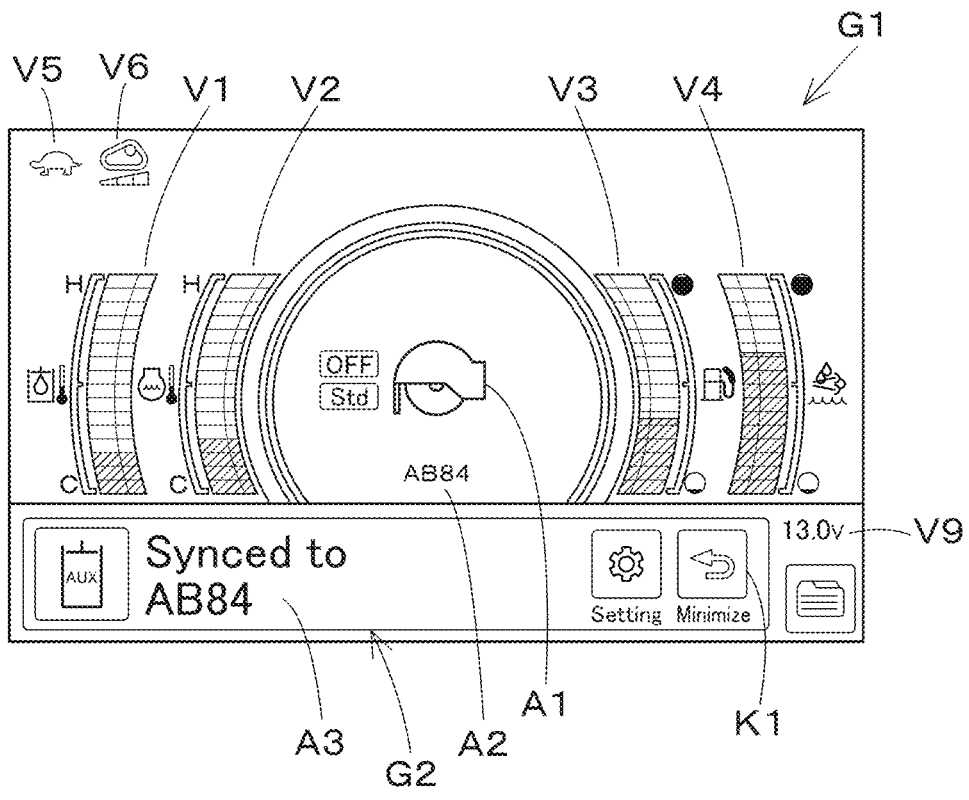
FIG. 15B illustrates an example of a monitor screen when an attachment is currently attached.

FIGS. 15A and 15B illustrate examples of the monitor screen G1 displayed by the in-vehicle user interface 25. While the working vehicle 1 is in operation, the vehicle controller 21 causes the in-vehicle user interface 25 to display the monitor screen G1. Also, the vehicle controller 21 causes the monitor screen G1 to display information relating to the state of the working vehicle 1 and/or the current date and time detected by sensors in or on the working vehicle 1. The information relating to the state of the working vehicle 1 includes the temperature V1 of the hydraulic fluid, the temperature V2 of cooling water, the remaining amount V3 of fuel, the remaining amount V4 of aqueous urea solution, the stage V5 of vehicle speed, the magnitude of the load V6 on the traveling device 5, an hour meter V7 (acting time) of the working vehicle 1, the rotation speed V8 of the prime mover 9 (engine), and the battery voltage V9.

When the latching mechanisms 51 are in the unlatching state and the attachment 30 is not attached to the quick hitch 16, as shown in FIG. 15A, in order to indicate that the central portion of the monitor screen G1 is a display area for the information relating to the attachment 30 which is an auxiliary hydraulic device, the vehicle controller 21 displays a default icon A0 in the central portion.

After the latching mechanisms 51 enter the latching state and the attachment 30 is attached to the quick hitch 16, the vehicle controller 21 performs step S47 in FIG. 13, to cause the monitor screen G1 to display pieces of information A1 to A3 corresponding to the attachment 30 corresponding to the selected attachment information.

In the example in FIG. 15B, the pieces of information A1 to A3 corresponding to the attachment 30 are an icon A1 representing the attachment 30, model number A2, and a message A3 indicating that the vehicle controller 21 (working vehicle 1) is synchronized with the attachment 30, which are displayed on the monitor screen G1. More specifically, since the attachment 30 identified is an angle broom, the icon A1 of the angle broom, the model number A2 "AB84" of the angle broom, and the message A3 "Synced to AB84" indicating that the angle broom is synchronized are displayed on the monitor screen G1. The driver (user) of the working vehicle 1 or the like can visually recognize these pieces of information A1 to A3 and can know the attachment 30 automatically identified (recognized) on the working vehicle 1.

The message A3 is displayed in the pop-up window G2. When a certain period of time has passed since the pop-up window G2 was displayed or if a Minimize key K1 in the pop-up window G2 is tapped on, the vehicle controller 21 stops displaying the pop-up window G2 (causes the pop-up window G2 to disappear) and displays information such as the date and time, the hour meter V7, the rotation speed V8 of the prime mover 9, and the battery voltage V9, etc. which were hidden by the pop-up window G2 (see FIG. 15A).

As shown in FIG. 15B, after the pieces of information A1 to A3 corresponding to the attachment 30 start to be displayed on the monitor screen G1, the user turns on an AUX activation switch (or the AUX mode switch 28), which is located in proximity to the seat 8. With this, the vehicle controller 21 changes the "OFF" displayed at the center of the monitor screen G1 into "ON", and highlights the icon A1 displayed. In so doing, the vehicle controller 21 may start the predetermined control at step S46 in FIG. 13 mentioned earlier.

Information corresponding to the attachment 30 other than the previously mentioned pieces of information A1 to A3 corresponding to the attachment 30 may be displayed on the monitor screen G1. For example, the vehicle controller 21 may cause the monitor screen G1 to display the name, the type and other specifications of the attachment 30 corresponding to the attachment ID included in the selected attachment information. Additionally or alternatively, the vehicle controller 21 may cause the monitor screen G1 to display information relating to the beacon transmitter 33 corresponding to the attachment ID (model number, other specifications, etc. of the beacon transmitter 33).

Additionally or alternatively, the vehicle controller 21 may transmit the BLE information D1, D2 and display data corresponding to the attachment ID included in the selected attachment information to a portable device 90 via the in-vehicle communicator 24 (FIG. 1), cause the display of the portable device 90 to display the monitor screen G1, and cause the monitor screen G1 to display information relating to the attachment 30 and/or the like.

Figure 16:
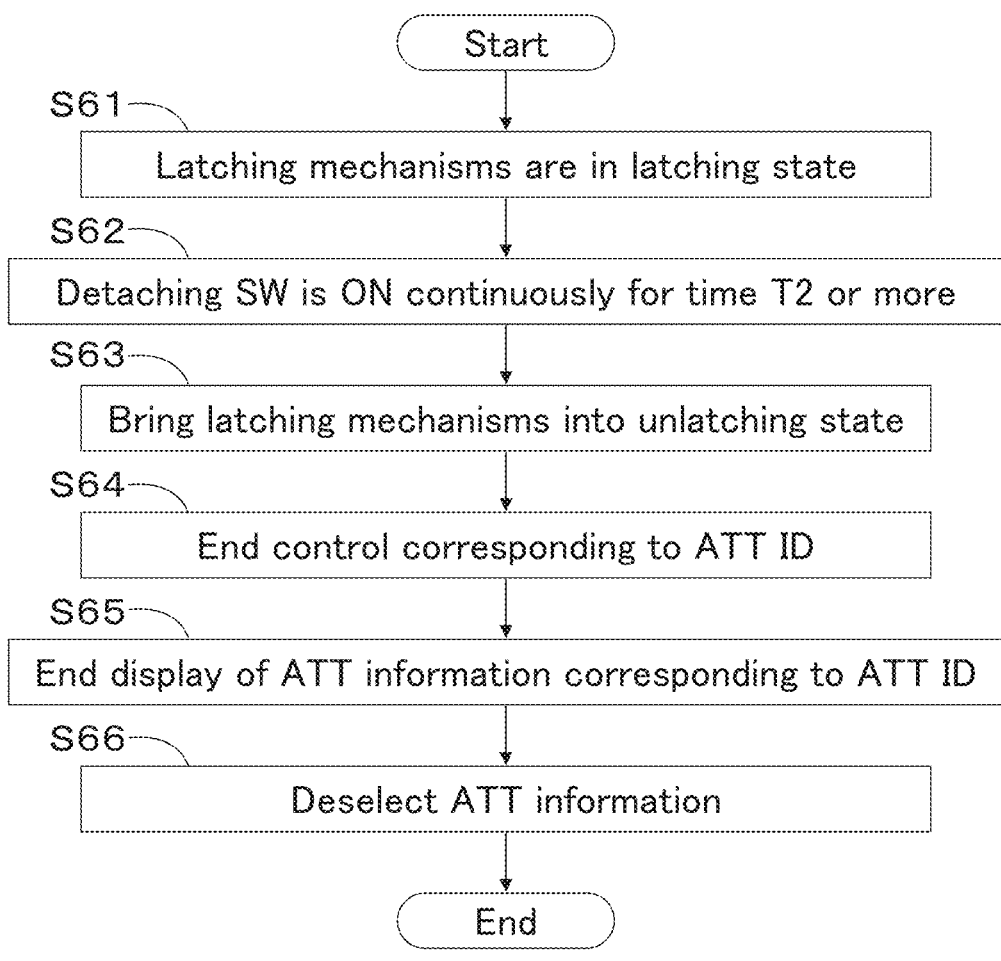
FIG. 16 is a flowchart showing an example of an ATT detaching process.

FIG. 16 is a flowchart showing an example of an ATT detaching process. When the vehicle controller 21 detects that the latching mechanism(s) 51 are in the latching state (YES at S61), if the detaching switch 27 is operated (turned ON) continuously for a predetermined period of time T2 or more (S62), the vehicle controller 21 causes the latch cylinder 52 to extend by a predetermined degree or more, allowing the latching mechanism(s) 51 to enter the unlatching state (S63). With this, the attachment 30 that was attached to the quick hitch 16 is allowed to be detached from the quick hitch 16, and the vehicle controller 21 recognizes that the attachment is allowed to be detached from the quick hitch 16.

Also, the vehicle controller 21 ends the predetermined control corresponding to the attachment ID of the currently selected attachment information (S64). In so doing, for example, in the case where the control of output of hydraulic fluid for the attachment 30 is being performed (started at step S46 of FIG. 13), the vehicle controller 21 stops that output control. With this, the hydraulic fluid will not be outputted anymore from the working vehicle 1 to the attachment 30.

Also, the vehicle controller 21 stops displaying information (started at step S47 of FIG. 13) relating to the attachment 30 on the monitor screen G1 as illustrated in FIG. 15B (S65). That is, the vehicle controller 21 causes the in-vehicle user interface 25 to cause the information A1 to A3 to disappear from the monitor screen G1, and stops the synchronization with the attachment 30.

Furthermore, the vehicle controller 21 deselects (resets) the attachment information (S66), so that no attachment information is selected. In so doing, the vehicle controller 21 may delete the information of the result of the identification of the attachment 30 from the nonvolatile memory 22, and the vehicle controller 21 may store the information as history in another storage area of the nonvolatile memory 22.

Figure 17:
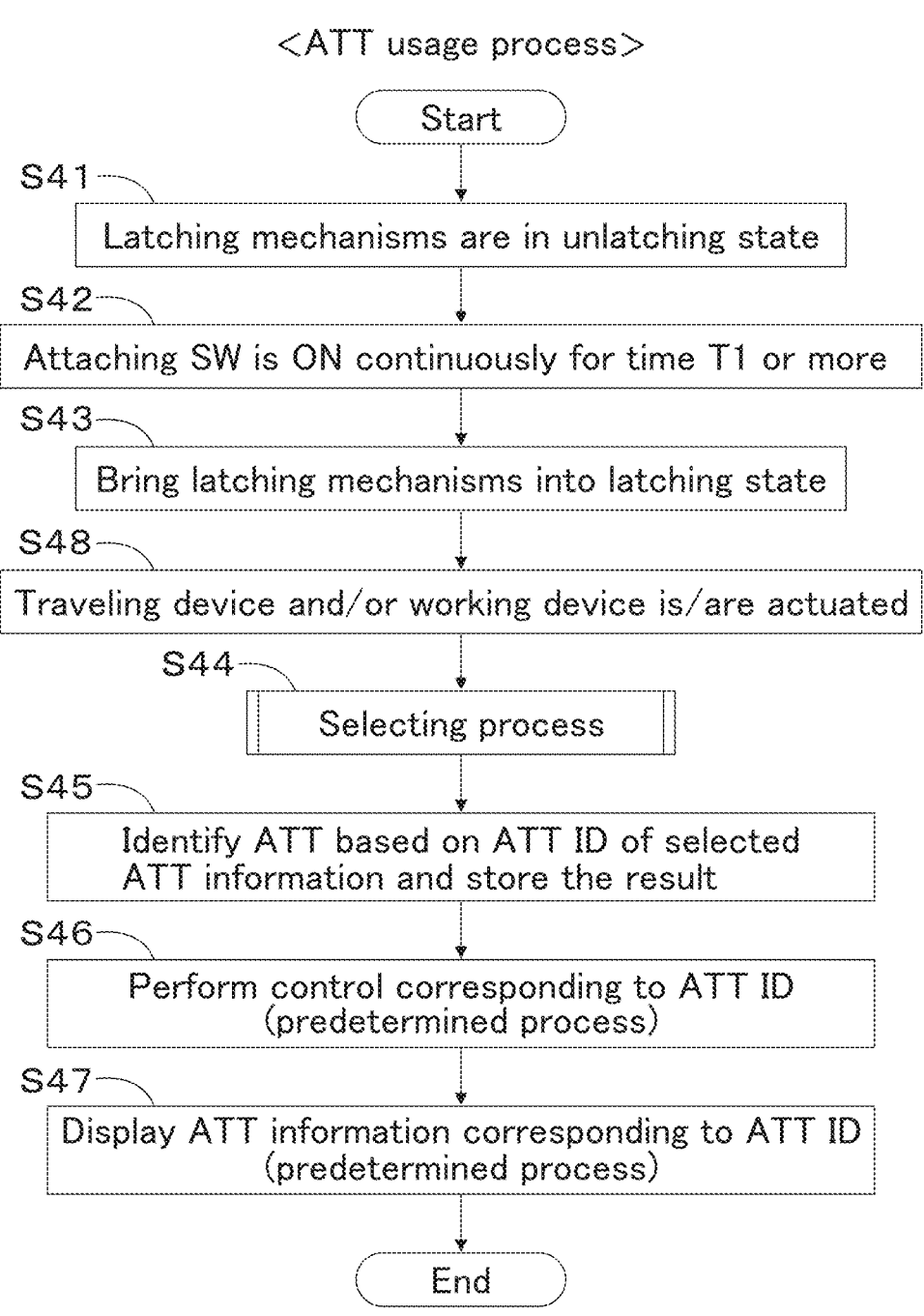
FIG. 17 is a flowchart showing another example of an ATT usage process.

In the ATT usage process shown in FIG. 13, the vehicle controller 21 performs a selecting process (S44) when the attaching switch 26 is operated continuously for a predetermined period of time T1 or more (S42) to attach the attachment 30 to the quick hitch 16. However, as shown in FIG. 17, for example, the vehicle controller 21 may perform a selecting process (S44) when the attaching switch 26 is operated continuously for a predetermined period of time T1 or more (S42) and the vehicle controller 21 detects that at least one of the traveling devices 5 or the working device 4 is in action with the attachment 30 attached to the quick hitch 16 (S48).

In such a case, for example, the vehicle controller 21 may determine that at least one of the traveling devices 5 or the working device 4 is action (S48) upon determining that at least one of the travel operator 6 or the work operator 7 has been operated continuously for a predetermined period of time T3 or more based on the pilot pressure detected by the pressure sensor(s) 48a.

Alternatively, for example, the vehicle controller 21 may detect that the traveling devices 5 are in action based on the traveling pressure detected by the pressure sensor(s) 48b and/or the rotation speed of the travel motors of the HSTs 46L and 46R detected by the rotation speed sensors 48c. Additionally or alternatively, for example, the vehicle controller 21 may detect that the working device 4 is in action based on the supply pressure of hydraulic fluid to the boom cylinder 14 and/or the front cylinder 15 detected by the pressure sensor(s) 49b and/or based on one or more of the detection results from detection sensors to detect the angle of pivot, vibrations, and/or acceleration of the boom cylinder 14 and/or the front cylinder 15.

Figure 18:
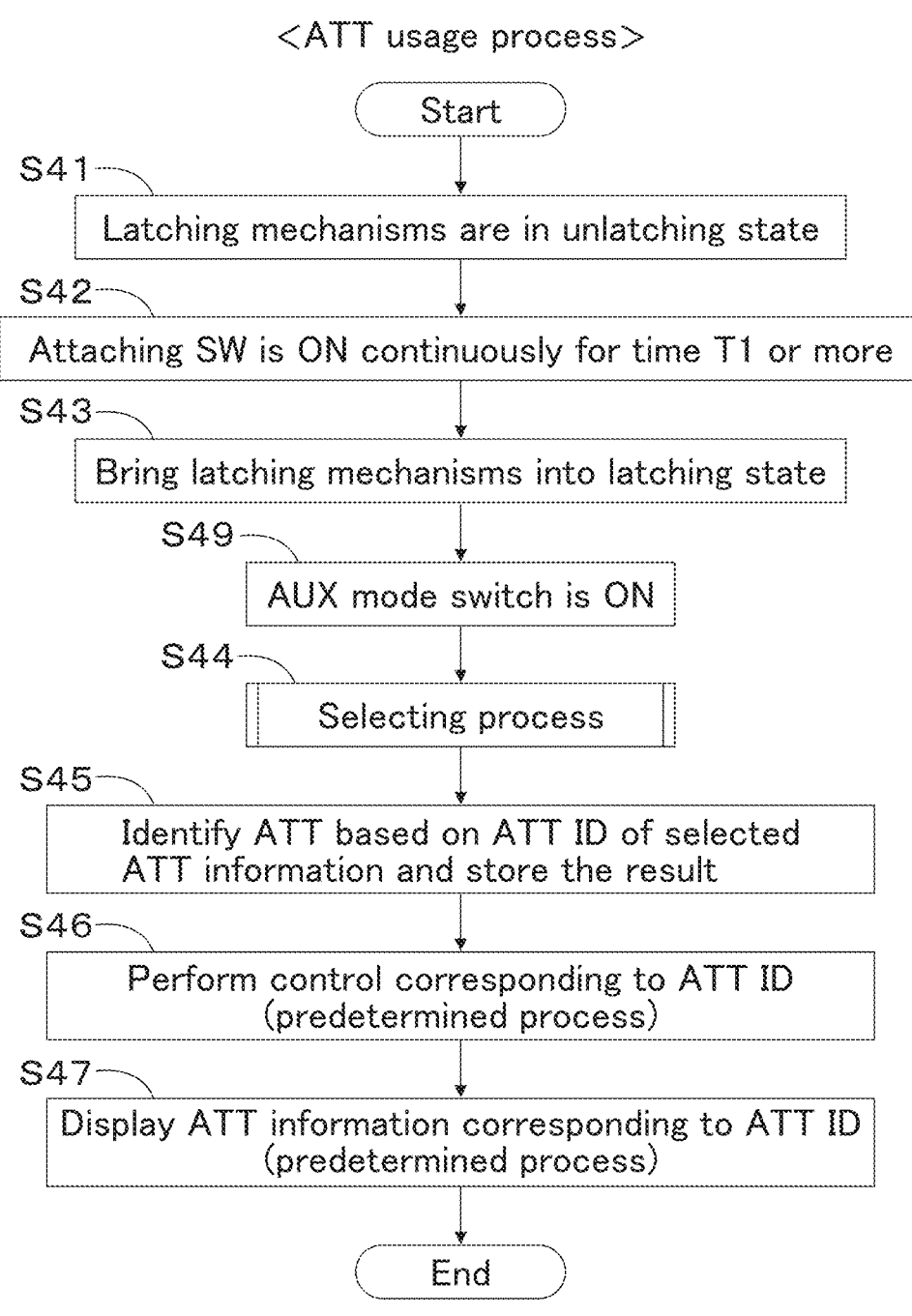
FIG. 18 is a flowchart showing another example of an ATT usage process.

For example, as shown in FIG. 18, the vehicle controller 21 may perform a selecting process (S44) when the attaching switch 26 is operated continuously for a predetermined period of time T1 or more (S42) and the AUX mode switch 28 to activate the AUX mode is operated (S49) with the attachment 30 attached to the quick hitch 16. The vehicle controller 21 may perform the selecting process when the AUX mode switch 28 is operated, without checking whether the attaching switch 26 is operated or not. The vehicle controller 21 may perform a selecting process when a predetermined switch such as the foregoing activation switch is operated instead of the AUX mode switch 28.

The vehicle controller 21 may perform a selecting process when a second BLE signal Q2 is received by the beacon scanner 23. In such a case, in the BLE information collecting process, the vehicle controller 21 may cause the internal memory 21a to store only first BLE signal(s) Q1 in a predetermined storage area. For example, the vehicle controller 21 may perform an attachment usage process as shown in FIG. 19.

FIG. 19 is a flowchart showing another example of an attachment usage process. When a second BLE signal Q2 transmitted from the portable device 90 is received by the beacon scanner 23 (YES at S71 in FIG. 19), the vehicle controller 21 acquires the RSSI of that second BLE signal Q2 from the beacon scanner 23 (S72). Then, if the acquired RSSI is greater than a predetermined value (second predetermined value) Y (YES at S73), the vehicle controller 21 reads information from the received second BLE signal Q2 (S74). Next, if second vibration information is included in the information read from the second BLE signal Q2, the vehicle controller 21 determines that there is vibration on the attachment 30 (YES at S75), and selects the second attachment information included in the information read from the second BLE signal Q2 (S76, selecting process).

After that, when the vehicle controller 21 detects that the latching mechanism(s) 51 are in the latching state (S81), the vehicle controller 21 identifies the attachment 30 attached to the quick hitch 16 based on the selected second attachment information (S82), performs a corresponding predetermined control (S83, predetermined process), and causes the in-vehicle user interface 25 to display (output) information about the corresponding attachment 30 (S84, predetermined process). Steps S82, S83 and S84 are similar to the foregoing steps S45, S46 and S47 in FIG. 13.

Also, when the vehicle controller 21 detects that a predetermined point in time is reached before the beacon scanner 23 receives a second BLE signal Q2 (NO at S71) (S77), the vehicle controller 21 checks whether there is any first BLE information D1 stored in the internal memory 21a. The predetermined point in time is, for example, a point in time at which at least one of the following conditions (selection start conditions) is satisfied: (i) the attaching switch 26 has been operated continuously for a predetermined period of time T1 or more; (ii) when the traveling device 5 and/or the working device 4 is/are actuated; or (iv) the AUX mode switch 28 is turned on. Note that other conditions may be used in order to check whether the predetermined point in time is reached.

If piece(s) of first BLE information D1 is/are stored in the internal memory 21a (YES at S78), the vehicle controller 21 reads the RSSI(s) included in the piece(s) of first BLE information D1, and selects the piece of first attachment information included in the piece of first BLE information D1 corresponding to the highest one of the read RSSI(s) (S79).

After that, when the vehicle controller 21 detects that the latching mechanism(s) 51 are in the latching state (S81), the vehicle controller 21 identifies the attachment 30 attached to the quick hitch 16 based on the selected first attachment information (S82), performs a predetermined control (S83, predetermined process), and causes the in-vehicle user interface 25 to display (output) information about the corresponding attachment 30 (S84, predetermined process). If there is no first BLE information D1 stored in the internal memory 21a (NO at S78), the vehicle controller 21 waits for a predetermined period of time Td (S80), and then returns to step S71.

In the above-described example embodiments, a beacon transmitter 33 in or on an attachment 30 and a portable device 90 each transmit a wireless signal Q1, Q2 compliant with Bluetooth (registered trademark) Low Energy, and the working vehicle 1 is provided with a beacon scanner 23 to receive the wireless signals Q1, Q2. However, additionally or alternatively, for example, the attachment 30 may be provided with a transmitter such as a radio frequency identification (RFID) tag, the working vehicle 1 may be provided with a receiver to receive wireless signals transmitted from the RFID, and a portable device which can transmit wireless signals having the same frequency as the wireless signals from the RFID may be used. Additionally or alternatively, a transmitter to transmit radio waves for some other near field communication and a receiver to receive the radio waves may be used.

In the above-described example embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the user manually attaches the attachment 30 to the hitch or manually detaches the attachment 30 from the hitch, the user may input information indicating that the attachment 30 is attached or detached using the in-vehicle user interface 25.

In the example embodiments above, the hardware switches 26 to 29, the hardware travel operator 6, and the hardware work operator 7 are provided in or on the working vehicle 1. Note, however, that this does not imply any limitation. For example, such switches may include a software attaching switch, a software detaching switch, a software AUX mode switch, a software AUX output switch, a software travel operator, a software work operator and/or the like provided on the monitor screen of the in-vehicle user interface 25.

The vehicle controller 21 may use, instead of or in addition to the in-vehicle user interface 25, a terminal device such as a portable device 90 external to the working vehicle 1 as an input and an output. In such a case, the vehicle controller 21 need only cause the in-vehicle communicator 24 to transmit various information to the terminal device and cause the terminal device to output the information. The vehicle controller 21 does not need to be provided in the working vehicle 1.

In the above-described example embodiments, the working device 4, the quick hitch 16, and the specific attachment 30b are provided with hydraulic actuators (such as the boom cylinders 14, the front cylinders 15, and the latch cylinder 52). Additionally or alternatively, the working device 4, the quick hitch 16, and the specific attachment may be provided with other actuators such as electric actuators including electric motors or hydraulic actuators other than the hydraulic cylinders. In the case where an attachment including an electric actuator is attached to the quick hitch 16, the vehicle controller 21 may output, as power for the electric actuator, electricity (power) from the battery 20 (FIG. 1) to the attachment via an external electric wire based on control data corresponding to the attachment.

An attachment including a work member to be actuated by power from the prime mover 9 of the working vehicle 1 may be attached to the quick hitch 16. In the case where such an attachment including a work member is attached to the quick hitch 16, the vehicle controller 21 may output power from the prime mover 9 to the attachment via a power transmission mechanism including gear(s), shaft(s), and/or the like based on control data corresponding to the attachment.

Attachment usage systems 100 according to example embodiments described so far may include feature(s) in any of the following item(s) and achieve the following effect(s).

(Item 1) An attachment usage system 100 including a working vehicle 1 including a hitch (quick hitch) 16 to attach and detach thereto and therefrom an attachment 30 to perform work, and a portable device 90, wherein the attachment 30 is operable to have therein or thereon a transmitter (beacon transmitter) 33 to periodically transmit a first wireless signal (first BLE signal) Q1 which includes a piece of first attachment information relating to the attachment 30 and which is compliant with a near field communication standard, the portable device 90 includes a short-distance communication interface 94 and is operable to transmit, via the short-distance communication interface 94, a second wireless signal (second BLE signal) Q2 which includes a piece of second attachment information relating to the attachment 30 to be attached to the hitch 16 and which is compliant with the near field communication standard, the working vehicle 1 includes a receiver (beacon scanner) 23 to receive the first wireless signal Q1 and the second wireless signal Q2, and a vehicle controller 21, and the vehicle controller 21 is configured or programmed to perform a selecting process to select, according to a predetermined condition, a piece of attachment information which is the piece of first attachment information or the piece of second attachment information included in one of one or more of the first and/or second wireless signals Q1, Q2 received by the receiver 23, and perform a predetermined process based on the piece of attachment information selected in the selecting process.

With the configuration according to item 1, in cases where an attachment 30 (30*a*, 30*b*) with a transmitter 33 is used with the working vehicle 1, the transmitter 33 transmits a first wireless signal Q1 including first attachment information relating to the attachment 30 (30*a*, 30*b*) and the receiver 23 receives the first wireless signal Q1. In cases where an attachment 30 (30*c*, 30*d*) with no transmitters 33 is used, the portable device 90 transmits a second wireless signal Q2 including second attachment information relating to the attachment 30 (30*a*, 30*b*) and the receiver 23 receives the second wireless signal Q2. Then, the first attachment information or the second attachment information included in the wireless signal(s) Q1, Q2 received by the receiver 23 that corresponds to the attachment 30 attached to the hitch 16 is selected according to a predetermined condition, and a predetermined process is performed based on the selected attachment information. That is, not only in cases where an attachment 30 (30*a*, 30*b*) with a transmitter 33 is used but also in cases where an attachment 30 (30*c*, 30*d*) with no transmitters 33 is used, it is possible, at the working vehicle 1, to automatically and appropriately perform a predetermined process corresponding to the attachment 30 to be used. This makes it possible to improve the convenience of using the attachment 30 with the working vehicle 1 and the responsivity of the corresponding predetermined process, and also possible to appropriately perform work using the attachment 30. Furthermore, since the portable device 90 transmits the second wireless signal Q2 compliant with the same near field communication standard as the first wireless signal Q1 transmitted by the transmitter 33, a single receiver 23 suffices in receiving the first wireless signal Q1 and the second wireless signal Q2, making it possible to prevent or reduce an increase in the number of devices in the working vehicle 1 and reduce the cost of communication and also possible to reduce the processing load on the vehicle controller 21.

(Item 2) The attachment usage system 100 according to item 1, wherein the portable device 90 includes an input interface 93, 95, 96 (portable device user interface 93, long-distance communication interface 95, imager 96) to receive input of information indicating the attachment 30 to be attached to the hitch 16, and a portable device controller 91 configured or programmed to cause the short-distance communication interface 94 to transmit the second wireless signal Q2 including the piece of second attachment information which corresponds to the information received via the input interface 93, 95, 96.

With the configuration according to item 2, by the user inputting information indicating the attachment 30 to be attached to the hitch 16 via the input interface 93, 95, 96, it is possible to transmit (input) the corresponding second attachment information from the portable device 90 to the working vehicle 1, making it possible to reduce the burden on the user making operations.

(Item 3) The attachment usage system 100 according to item 2, wherein the portable device 90 includes a portable device memory 92 to store one or more of the pieces of second attachment information relating to one or more of the attachments 30 usable with the working vehicle 1, and the portable device controller 91 is configured or programmed to read, from the portable device memory 92, one of the one or more pieces of second attachment information that corresponds to the information received via the input interface 93, 96.

With the configuration according to item 3, by the user inputting information indicating the attachment 30 to be attached to the hitch 16 via the input interface 93, 96, it is possible to easily and quickly transmit the corresponding second attachment information from the portable device 90 to the working vehicle 1.

(Item 4) The attachment usage system 100 according to item 2 or 3, further including a server 80 to store one or more of the pieces of second attachment information relating to one or more of the attachments 30 usable with the working vehicle 1, wherein the input interface of the portable device 90 includes a user interface 93, and a long-distance communication interface 95 to communicate with the server 80, and the portable device controller 91 is configured or programmed to receive, via the long-distance communication interface 95 from the server 80, one of the one or more pieces of second attachment information that corresponds to the information received via the user interface 93.

With the configuration according to item 4, even if the portable device 90 does not include the second attachment information relating to the attachment 30 attached to the working vehicle 1, the portable device 90 is able to acquire the second attachment information from the server 80 and transmit it to the working vehicle 1. It follows that it is possible to use, on the working vehicle 1, various types of attachments 30 including new types of attachments 30, old types of attachments 30, and specific attachments 30.

(Item 5) The attachment usage system 100 according to any one of items 2 to 4, wherein the input interface of the portable device 90 includes a code reader (imager) 96 to read an attachment code indicating the attachment 30 to be attached to the hitch 16, and the portable device controller 91 is configured or programmed to acquire the piece of second attachment information based on the attachment code read by the code reader 96.

With the configuration according to item 5, by the user having the attachment code indicating the attachment 30 to be attached to the hitch 16 read by the code reader 96, it is possible to easily input the corresponding second attachment information from the portable device 90 into the working vehicle 1, making it possible to further reduce the burden on the user making operations.

(Item 6) The attachment usage system 100 according to any one of items 1 to 5, wherein the working vehicle 1 includes an attaching switch 26 to be operated to attach the attachment 30 to the hitch 16, and the vehicle controller 21 is configured or programmed to perform the selecting process when the attaching switch 26 is operated continuously for a predetermined period T1 or more.

With the configuration according to item 6, even if a plurality of attachments 30 are present in the vicinity of the working vehicle 1, when an attachment 30 (30*a* to 30*d*) is attached to the hitch 16, the vehicle controller 21 is able to select a piece of attachment information corresponding to the attached attachment 30 and appropriately perform a predetermined process, and also able to perform work appropriately.

(Item 7) The attachment usage system 100 according to any one of items 1 to 6, wherein the working vehicle 1 includes a traveling device 5 to cause a vehicle body 2 to travel, and a working device 4 to change at least one of a position or a posture of the attachment 30 attached to the hitch 16 to cause the attachment 30 to perform work, wherein the vehicle controller 21 is configured or programmed to perform the selecting process when at least one of the traveling device 5 or the working device 4 is actuated with the attachment 30 attached to the hitch 16.

With the configuration according to item 7, when work is to be performed using an attachment 30 (30*a* to 30*d*) attached to the hitch 16 and/or when the working vehicle 1 is caused to move with the attachment 30 attached to the hitch 16, the vehicle controller 21 is able to select a piece of attachment information corresponding to the attached attachment 30 and appropriately perform a predetermined process, and also able to perform work appropriately.

(Item 8) The attachment usage system 100 according to any one of items 1 to 7, wherein the working vehicle 1 includes a mode switch (AUX mode switch) 28 to be operated to activate an attachment mode (AUX mode) in which work is performed by the attachment 30 attached to the hitch 16, and the vehicle controller 21 is configured or programmed to perform the selecting process when the mode switch 28 is operated.

With the configuration according to item 8, when work is to be performed using an attachment 30 (30*a* to 30*d*) attached to the hitch 16, the vehicle controller 21 is able to select a piece of attachment information corresponding to the attached attachment 30 and appropriately perform a predetermined process, and also able to perform work appropriately.

(Item 9) The attachment usage system 100 according to any one of items 1 to 8, wherein the working vehicle 1 includes a memory (internal memory) 21*a* to store, for a period of time Tm, one or more of the pieces of first attachment information included in one or more of the first wireless signals Q1 received by the receiver 23, and the vehicle controller 21 is configured or programmed to, when the second wireless signal Q2 is received by the receiver 23, perform the selecting process to select the piece of second attachment information included in the received second wireless signal Q2, and, at a predetermined point in time different from when the second wireless signal Q2 is received, perform the selecting process to select, according to the predetermined condition, one of the one or more pieces of first attachment information stored in the memory 21*a*.

With the configuration according to item 9, even if the driver of the working vehicle 1 does not operate the switch 26, 28, the traveling devices 5, or the working device 4, when the second wireless signal Q2 from the portable device 90 is received by the receiver 23, the vehicle controller 21 is able to easily and quickly select the second attachment information that is included in the second wireless signal Q2 and that corresponds to the attachment 30 attached to the working vehicle 1, making it possible to reduce the processing load on the vehicle controller 21. When no second wireless signals Q2 are transmitted from the portable device 90, the vehicle controller 21 selects, at a predetermined point in time, a piece of first attachment information corresponding to the attachment 30 attached to the hitch 16 from one or more pieces of first attachment information included in first wireless signal(s) Q1 transmitted from transmitter(s) 33 and received by the receiver 23, making it possible to appropriately perform a predetermined process.

(Item 10) The attachment usage system 100 according to any one of items 1 to 9, wherein the working vehicle 1 includes a memory 21*a* to store, for a period of time Tm, one or more of the pieces of first attachment information included in one or more of the first wireless signals Q1 received by the receiver 23 and one or more of the pieces of second attachment information included in one or more of the second wireless signals Q2 received by the receiver 23, and the vehicle controller 21 is configured or programmed to perform the selecting process to select, according to the predetermined condition, one of the one or more pieces of first and/or second attachment information stored in the memory 21*a*.

With the configuration according to item 10, it is possible to select, according to a predetermined condition with high accuracy (with high reliability), a piece of attachment information corresponding to the attachment 30 attached to the hitch 16 from one or more pieces of attachment information included in wireless signal(s) Q1, Q2 which were received by the receiver 23 during a period of time Tm which ended when the selecting process was started.

(Item 11) The attachment usage system 100 according to item 10, wherein the vehicle controller 21 is configured or programmed to, when the first wireless signal Q1 is received by the receiver 23, if a received signal strength (RSSI) of the first wireless signal Q1 is equal to or higher than a first predetermined value X, cause the memory 21*a* to store the piece of first attachment information included in the first wireless signal Q1, and when the second wireless signal Q2 is received by the receiver 23, if a received signal strength of the second wireless signal Q2 is equal to or higher than a second predetermined value X, Y, cause the memory 21*a* to store the piece of second attachment information included in the second wireless signal Q2.

With the configuration according to item 11, it is possible to collect, in the memory 21*a*, only the piece(s) of attachment information included in wireless signal(s) Q1, Q2 transmitted from the transmitter(s) 33 and/or the portable device(s) 90 present in the vicinity of the working vehicle 1 and received by the receiver 23. It is then possible, in the selecting process, to more accurately select a piece of attachment information corresponding to the attachment 30 attached to the hitch 16 according to a predetermined condition from the piece(s) of attachment information collected in the memory 21*a*.

(Item 12) The attachment usage system 100 according to item 10 or 11, wherein the transmitter 33 includes a vibration sensor 34 and is operable to, if the vibration sensor 34 detects vibration before the transmitter 33 transmits the first wireless signal Q1, transmit the first wireless signal Q1 which includes a piece of first vibration information indicating that there is vibration, the portable device 90 includes an input interface 93, 95, 96 and a portable device controller 91, the portable device controller 91 is configured or programmed to, if information indicating the attachment 30 to be attached to the hitch 16 is received via the input interface 93, 95, 96, cause the short-distance communication interface 94 to transmit the second wireless signal Q2 including a piece of second vibration information indicating that there is vibration, and the vehicle controller 21 is configured or programmed to, when the first wireless signal Q1 is received by the receiver 23, if the first wireless signal Q1 includes the piece of first vibration information, cause the memory 21a to store the piece of first attachment information included in the first wireless signal Q1, and when the second wireless signal Q2 is received by the receiver 23, if the second wireless signal Q2 includes the piece of second vibration information, cause the memory 21a to store the piece of second attachment information included in the second wireless signal Q2.

With the configuration according to item 12, since an attachment 30 vibrates when attached to the hitch 16, it is possible to collect, in the memory 21a, first attachment information and second attachment information corresponding to the attachment(s) 30 attached to the hitch 16. It follows that it is possible, in the selecting process, to more accurately select a piece of attachment information corresponding to the attachment 30 attached to the hitch 16, according to a predetermined condition, from one or more pieces of attachment information collected in the memory 21a.

(Item 13) The attachment usage system 100 according to any one of items 10 to 12, wherein the vehicle controller 21 is configured or programmed to, when the first wireless signal Q1 is received by the receiver 23, cause the memory 21a to store a piece of transmitter information relating to the transmitter 33 included in the first wireless signal Q1 such that the piece of transmitter information and the piece of first attachment information are associated with each other, when the second wireless signal Q2 is received by the receiver 23, cause the memory 21a to store a piece of portable device information relating to the portable device 90 included in the second wireless signal Q2 such that the piece of portable device information and the piece of second attachment information are associated with each other, and in performing the selecting process, if the one or more pieces of first and/or second attachment information stored in the memory 21a include the piece of second attachment information associated with the piece of portable device information, select the piece of second attachment information.

With the configuration according to item 13, the vehicle controller 21 is able to select, with priority, second attachment information that corresponds to the attachment 30 attached to the hitch 16 and that is transmitted from the portable device 90, and appropriately perform a predetermined process corresponding to the second attachment information.

(Item 14) The attachment usage system 100 according to item 13, wherein the vehicle controller 21 is configured or programmed to, when the first wireless signal Q1 is received by the receiver 23, cause the memory 21a to store a received signal strength of the first wireless signal Q1 such that the received signal strength is associated with the piece of transmitter information and the piece of first attachment information, and in performing the selecting process, if the one or more pieces of attachment information stored in the memory 21a only include one or more of the pieces of first attachment information associated with one or more of the pieces of transmitter information, select one of the one or more pieces of first attachment information that is associated with a highest one of one or more of the received signal strengths stored in the memory 21a.

With the configuration according to item 14, even if a plurality of attachments 30 are present in the vicinity of the working vehicle 1 and a plurality of transmitters 33 in or on the attachments 30 transmit first wireless signals Q1, the vehicle controller 21 is able to more accurately select a piece of first attachment information transmitted from the closest transmitter 33, i.e., a piece of first attachment information corresponding to the attachment 30 attached to the hitch 16, from pieces of first attachment information included in the first wireless signals Q1 received by the receiver 23. The vehicle controller 21 is then able to appropriately perform a predetermined process based on the selected piece of first attachment information.

(Item 15) The attachment usage system 100 according to any one of items 1 to 14, wherein the working vehicle 1 includes a detaching switch 27 to be operated to allow the attachment 30 to be detached from the hitch 16, and the vehicle controller 21 is configured or programmed to, when the detaching switch 27 is operated continuously for a predetermined period of time or more T2, end the predetermined process and deselect the selected piece of attachment information.

With the configuration according to item 15, when the attachment 30 is allowed to be detached from the hitch 16 and the attachment 30 is not used on the working vehicle 1 anymore, the vehicle controller 21 is able to appropriately end the predetermined process corresponding to the attachment 30 and desynchronize the attachment 30. The vehicle controller 21 is then able to deal with the attachment 30 to be used next.

(Item 16) The attachment usage system 100 according to any one of items 1 to 15, wherein the transmitter 33 includes a beacon transmitter, the receiver 23 includes a beacon scanner, and the portable device 90 is operable to transmit, via the short-distance communication interface 94, the second wireless signal Q2 with a same frequency as the first wireless signal Q1 transmitted by the beacon transmitter 33.

The configuration according to item 16 eliminates the need to provide the working vehicle 1 with a communicator only to communicate with the portable device 90, making it possible to prevent or reduce an increase in the number of devices in the working vehicle 1. Furthermore, it is possible, using highly versatile beacon transmitters 33, beacon scanner 23, and/or portable device(s) 90, to input attachment information corresponding to the attachment 30 attached to the hitch 16 into the working vehicle 1 without using external networks such as mobile telephone communication networks or the Internet to appropriately and quickly perform a predetermined process, making it possible to reduce the cost for communication.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An attachment usage system comprising:
a working vehicle including a hitch to attach and detach thereto and therefrom an attachment to perform work; and
a portable device; wherein
the attachment is operable to have therein or thereon a transmitter to periodically transmit a first wireless signal which includes a piece of first attachment information relating to the attachment and which is compliant with a near field communication standard;

the portable device includes a short-distance communication interface and is operable to transmit, via the short-distance communication interface, a second wireless signal which includes a piece of second attachment information relating to the attachment to be attached to the hitch and which is compliant with the near field communication standard;

the working vehicle includes:
  a receiver to receive the first wireless signal and the second wireless signal; and
  a vehicle controller including a processor and a memory to store, for a period of time, one or more of the pieces of first attachment information included in one or more of the first wireless signals received by the receiver and one or more of the pieces of second attachment information included in one or more of the second wireless signals received by the receiver; and the vehicle controller is configured or programmed to:
  perform a selecting process to select, according to a predetermined condition, a piece of attachment information which is the piece of first attachment information or the piece of second attachment information included in one of one or more of the first and/or second wireless signals received by the receiver, and perform a predetermined process based on the piece of attachment information selected in the selecting process; and
  perform the selecting process to select, according to the predetermined condition, one of the one or more pieces of first and/or second attachment information stored in the memory;

the transmitter includes a vibration sensor and is operable to, if the vibration sensor detects vibration before the transmitter transmits the first wireless signal, transmit the first wireless signal which includes a piece of first vibration information indicating that there is vibration;

the portable device includes an input interface and a portable device controller including a processor and a memory;

the portable device controller is configured or programmed to, if information indicating the attachment to be attached to the hitch is received via the input interface, cause the short-distance communication interface to transmit the second wireless signal including a piece of second vibration information indicating that there is vibration; and the vehicle controller is configured or programmed to:
  when the first wireless signal is received by the receiver, if the first wireless signal includes the piece of first vibration information, cause the memory to store the piece of first attachment information included in the first wireless signal; and
  when the second wireless signal is received by the receiver, if the second wireless signal includes the piece of second vibration information, cause the memory to store the piece of second attachment information included in the second wireless signal.

2. The attachment usage system according to claim 1, wherein
  the portable device includes:
    the input interface to receive input of information indicating the attachment to be attached to the hitch; and the portable device controller configured or programmed to cause the short-distance communication interface to transmit the second wireless signal including the piece of second attachment information which corresponds to the information received via the input interface.

3. The attachment usage system according to claim 2, wherein
  the portable device includes a portable device memory to store one or more of the pieces of second attachment information relating to one or more of the attachments usable with the working vehicle; and
  the portable device controller is configured or programmed to read, from the portable device memory, one of the one or more pieces of second attachment information that corresponds to the information received via the input interface.

4. The attachment usage system according to claim 2, further comprising:
  a server to store one or more of the pieces of second attachment information relating to one or more of the attachments usable with the working vehicle; wherein
  the input interface includes:
    a user interface; and
    a long-distance communication interface to communicate with the server; and
  the portable device controller is configured or programmed to receive, via the long-distance communication interface from the server, one of the one or more pieces of second attachment information that corresponds to the information received via the user interface.

5. The attachment usage system according to claim 2, wherein
  the input interface includes a code reader to read an attachment code indicating the attachment to be attached to the hitch; and
  the portable device controller is configured or programmed to acquire the piece of second attachment information based on the attachment code read by the code reader.

6. The attachment usage system according to claim 1, wherein
  the working vehicle includes an attaching switch to be operated to attach the attachment to the hitch; and
  the vehicle controller is configured or programmed to perform the selecting process when the attaching switch is operated continuously for a predetermined period or more.

7. The attachment usage system according to claim 1, wherein
  the working vehicle includes:
    a traveling device to cause a vehicle body to travel; and
    a working device to change at least one of a position or a posture of the attachment attached to the hitch to cause the attachment to perform work, wherein
  the vehicle controller is configured or programmed to perform the selecting process when at least one of the traveling device or the working device is actuated with the attachment attached to the hitch.

8. The attachment usage system according to claim 1, wherein
  the working vehicle includes a mode switch to be operated to activate an attachment mode in which work is performed by the attachment attached to the hitch; and the vehicle controller is configured or programmed to perform the selecting process when the mode switch is operated.

9. The attachment usage system according to claim 1, wherein the working vehicle includes the memory to store, for a period of time, one or more of the pieces of first attachment information included in one or more of the first wireless signals received by the receiver; and the vehicle controller is configured or programmed to:

when the second wireless signal is received by the receiver, perform the selecting process to select the piece of second attachment information included in the received second wireless signal; and at a predetermined point in time different from when the second wireless signal is received, perform the selecting process to select, according to the predetermined condition, one of the one or more pieces of first attachment information stored in the memory.

10. The attachment usage system according to claim 1, wherein the vehicle controller is configured or programmed to:

when the first wireless signal is received by the receiver, if a received signal strength of the first wireless signal is equal to or higher than a first predetermined value, cause the memory to store the piece of first attachment information included in the first wireless signal; and when the second wireless signal is received by the receiver, if a received signal strength of the second wireless signal is equal to or higher than a second predetermined value, cause the memory to store the piece of second attachment information included in the second wireless signal.

11. The attachment usage system according to claim 1, wherein the vehicle controller is configured or programmed to:

when the first wireless signal is received by the receiver, cause the memory to store a piece of transmitter information relating to the transmitter included in the first wireless signal such that the piece of transmitter information and the piece of first attachment information are associated with each other;

when the second wireless signal is received by the receiver, cause the memory to store a piece of portable device information relating to the portable device included in the second wireless signal such that the piece of portable device information and the piece of second attachment information are associated with each other; and in performing the selecting process, if the one or more pieces of first and/or second attachment information stored in the memory include the piece of second attachment information associated with the piece of portable device information, select the piece of second attachment information.

12. The attachment usage system according to claim 11, wherein the vehicle controller is configured or programmed to:

when the first wireless signal is received by the receiver, cause the memory to store a received signal strength of the first wireless signal such that the received signal strength is associated with the piece of transmitter information and the piece of first attachment information; and in performing the selecting process, if the one or more pieces of attachment information stored in the memory only include one or more of the pieces of first attachment information associated with one or more of the pieces of transmitter information, select one of the one or more pieces of first attachment information that is associated with a highest one of one or more of the received signal strengths stored in the memory.

13. The attachment usage system according to claim 1, wherein the working vehicle includes a detaching switch to be operated to allow the attachment to be detached from the hitch; and the vehicle controller is configured or programmed to, when the detaching switch is operated continuously for a predetermined period of time or more, end the predetermined process and deselect the selected piece of attachment information.

14. The attachment usage system according to claim 1, wherein the transmitter includes a beacon transmitter;

the receiver includes a beacon scanner; and the portable device is operable to transmit, via the short-distance communication interface, the second wireless signal with a same frequency as the first wireless signal transmitted by the beacon transmitter.

* * * * *